US009390460B2

(12) United States Patent
Caton et al.

(10) Patent No.: US 9,390,460 B2
(45) Date of Patent: Jul. 12, 2016

(54) SYSTEM AND METHOD FOR DYNAMIC GENERATION OF EMBEDDED SECURITY FEATURES IN A DOCUMENT

(71) Applicant: Document Security Systems, Inc., Rocheter, NY (US)

(72) Inventors: Michael Caton, Oakfield, NY (US); David Wicker, Dansville, NY (US); Patrick White, Mendon, NY (US); Michael Roy, Webster, NY (US); Timothy Trueblood, Pittsford, NY (US)

(73) Assignee: Document Security Systems, Inc., Rochester, NY (US)

( * ) Notice: Subject to any disclaimer, the term of this patent is extended or adjusted under 35 U.S.C. 154(b) by 0 days.

(21) Appl. No.: 14/356,102

(22) PCT Filed: Nov. 1, 2012

(86) PCT No.: PCT/US2012/062918
§ 371 (c)(1),
(2) Date: May 2, 2014

(87) PCT Pub. No.: WO2013/067092
PCT Pub. Date: May 10, 2013

(65) Prior Publication Data
US 2014/0355069 A1 Dec. 4, 2014

Related U.S. Application Data

(60) Provisional application No. 61/555,843, filed on Nov. 4, 2011.

(51) Int. Cl.
H04N 1/405 (2006.01)
G06T 1/00 (2006.01)
(Continued)

(52) U.S. Cl.
CPC .............. *G06T 1/0021* (2013.01); *B42D 25/30* (2014.10); *G06F 3/1238* (2013.01);
(Continued)

(58) Field of Classification Search
CPC .......... H04N 1/32144; H04N 1/32128; H04N 1/3232; H04N 1/32325; H04N 1/32331; H04N 1/32336; H04N 1/32341; H04N 1/32347; H04N 1/32352; G06F 3/1242; G06F 3/1243
USPC ................... 358/3.28, 1.9, 2.1, 468, 400, 500
See application file for complete search history.

(56) References Cited

U.S. PATENT DOCUMENTS 5,444,779 A * 8/1995 Daniele .......................... 399/366
2008/0048433 A1 * 2/2008 Wicker et al. ................... 283/94

FOREIGN PATENT DOCUMENTS

EP         884669 A2 * 12/1998
WO  WO 2004110773 A1 * 12/2004

Primary Examiner — Thomas D Lee
Assistant Examiner — Stephen Brinich
(74) Attorney, Agent, or Firm — McDonnell Boehnen Hulbert & Berghoff LLP

(57) ABSTRACT

A system for dynamically generating a digital image comprising a security feature for a document. The system includes a processor 222 configured to receive data indicative of a security feature to be embedded in the document. The processor 222 generates a digital image having content at least partially specified by the received data. The processor 222 transmits a signal indicative of the generated digital image. The generated digital image has a foreground and a background, at least one of which includes a line screen pattern. The foreground and the background of the digital image are configured such that a scanned reproduction of an original printed version of the digital image is reproduced in an altered form relative to the original printed version.

10 Claims, 15 Drawing Sheets

(51) Int. Cl.
*H04N 1/00* (2006.01)
*G06F 3/12* (2006.01)
*G06K 15/02* (2006.01)
*B42D 25/30* (2014.01)
*G07D 7/00* (2016.01)

(52) U.S. Cl.
CPC .......... *G06K 15/1867* (2013.01); *G06T 1/005* (2013.01); *G07D 7/002* (2013.01); *H04N 1/0087* (2013.01); *H04N 1/00883* (2013.01); *G06T 2201/0051* (2013.01); *G06T 2201/0064* (2013.01)

SYSTEM AND METHOD FOR DYNAMIC GENERATION OF EMBEDDED SECURITY FEATURES IN A DOCUMENT

CROSS REFERENCE TO RELATED APPLICATIONS

This application is a U.S. national phase application of International Patent Application No. PCT/US2012/062918, filed Nov. 1, 2012, which claims priority to U.S. Provisional Application No. 61/555,843, filed Nov. 4, 2011, the contents of each are incorporated entirely herein by reference.

FIELD OF THE INVENTION

The present disclosure generally relates to document protection methods and products, and more particularly systems and methods for dynamically generating embedded security features to be incorporated in a document.

BACKGROUND

Security features are embedded in documents such as official and/or valuable documents by incorporating security features in the documents that are modified upon reproducing the document to thereby inhibit unauthorized copies of the documents from being made. Such security features can include latent features that are largely indistinguishable within the background of the document on an original, but which become distinguishable in a reproduction of the document such as in a scanned reproduction of the document. By embedding features that distinguish an original document from reproductions thereof, counterfeit versions and other unauthorized copies can be more readily detected. Thus, such documents including embedded security features offer an indicator of authenticity to ensure that a particular printed version of the document is an original.

In applications such as commercial paper documents, security features are typically incorporated in a background of the document with latent security features embodied as words that will appear in reproductions of the commercial paper document. In reproductions of the document, the latent security features become visible, which allows unauthorized copies to feature words such as "void" or "copy" to indicate it is not an original. However, the background of the commercial paper document is generally static with pertinent information being printed, typed, or rendered over or adjacent the static background.

Conventional methods and products involve preparing an original document by printing or lithography on high quality print media to achieve high resolution printing in order to effectively embed the above-described security features. Prior printing systems for generating documents with embedded security features employ offset printing technology to produce prints at approximate resolutions of at least 2400 dots per inch.

In the present information environment, many documents are prepared and utilized in electronic form. As a result, systems and methods have been developed to digitally protect contents of electronic documents utilizing encryption technology. Documents which have been encrypted are then locked, and the encrypted file must be decrypted before the contents of the file can be sensibly reconstructed. Encryption and decryption technologies vary somewhat, but generally require that a key be created or constructed in order to decrypt a desired file. The contents of the file can thereby be protected by limiting access to the key.

SUMMARY

According to some aspects of the present disclosure, a system for dynamically generating a digital image comprising a security feature for a document is disclosed. In some embodiments, the system includes a processor configured to: receive data indicative of a security feature to be embedded in the document, generate a digital image having content at least partially specified by the received data, and transmit a signal indicative of the generated digital image. In some embodiments, the generated digital image has a foreground and a background, at least one of which includes a line screen pattern. In some embodiments, the foreground and the background of the digital image are configured such that a scanned reproduction of an original printed version of the digital image is reproduced in an altered form relative to the original printed version. In some embodiments, the system includes a communication interface for conveying the received data to the processor and conveying the transmitted signal from the processor. In some embodiments, the system includes a second processor configured as a print driver for receiving the transmitted signal, via the communication interface, embedding the generated digital image in a digital version of the document, and sending instructions to a printer system to print the document.

In some embodiments, the foreground of the digital image comprises a latent image that is embedded within a visually integrated setting of the document. In some embodiments, the foreground comprises a latent image that is indistinguishable from the background with the naked eye in an original printed version. In some embodiments, the latent image is distinguishable from the background in a reproduction of the original printed version. In some embodiments, the latent image includes a symbol that, while visible, prompts a viewer to identify the document as a copy of the original printed version. In some embodiments, the latent image is arranged in a region shared with a bar code readable, on the original printed version, by an optical bar code scanner, and the latent image includes features that interfere with optical recognition of the bar code by the bar code scanner, on a reproduction or visual facsimile of the original printed version. In some embodiments, the received data includes information specifying characters or symbols portrayed via a line screen pattern included in the foreground of the generated digital image. In some embodiments, the received data includes information specifying a printer system for printing the document, and the processor is further configured to generate the digital image according to one or more settings predetermined to provide desirable printing performance on the specified printer system. In some embodiments, the one or more settings comprise at least one of line frequency, line orientation, or print density. In some embodiments, the generated digital image includes a latent image embedded within a visually integrated setting of the document, and the latent image includes a line screen pattern. In some embodiments, the original printed version of the latent image is distinguishable from the visually integrated setting with a visual aid having a characteristic line frequency corresponding to the line frequency of the line screen pattern of the latent image. In some embodiments, the latent image is configured to be reproduced in an altered form so that the latent image is not similarly distinguishable from the visually integrated setting with the visual aid. In some embodiments, the latent image includes one or more characters indicative of the received data. In some embodiments, the processor is further configured to generate the dynamically digital image responsive to receiving the received data.

According to some aspects of the present disclosure, a method for embedding security features in a document is disclosed. In some embodiments, the method includes: receiving data indicative of a security feature to be embedded in the document; generating a digital image having content at least partially specified by the received data, and embedding the generated digital image in the document. In some embodiments, the generated digital image has a foreground and a background, at least one of which includes a line screen pattern. In some embodiments, the foreground and the background of the digital image are configured such that a scanned reproduction of an original printed version of the digital image is reproduced in an altered form relative to the original printed version.

In some embodiments, the method includes sending instructions to a printing system to print the document. In some embodiments, the method includes determining a printing system specified by the data responsive to receiving the data. In some embodiments, the method includes retrieving, from a memory, one or more image generation settings predetermined to produce desirable printed results for the specified printing system. In some embodiments, the generating is carried out according to one or more retrieved image generation settings. In some embodiments, the method includes submitting a query to a lookup table within the memory to determine whether the specified printing system is associated with an entry in the lookup table corresponding with the one or more image generation settings. In some embodiments, the method includes retrieving the corresponding one or more image generation settings responsive to determining that the specified printing system is associated with an entry in the lookup table. In some embodiments, the method includes retrieving default one or more image generation settings responsive to determining that the specified printing system is not associated with an entry in the lookup table. In some embodiments, the one or more image generation settings include at least one of: line frequency, line orientation, or print density. In some embodiments, the method includes rendering a portion of an electronic version of a document as a color associated with a security feature. In some embodiments, the method includes sending the electronic version of the document through a filter configured to: identify the portion of the electronic version of the document, generate a security feature based in part on the identified portion, and embed the security feature in the electronic version of the document. In some embodiments, the method includes saving an electronic version of the document which includes the embedded security feature.

According to some aspects of the present disclosure, a method of selectively encrypting data within an electronic document is disclosed. In some embodiments, the method includes: identifying at least one portion of the electronic document configured to be rendered in a first color associated with a first level of encryption security. In some embodiments, the method includes encrypting the at least one portion of the electronic document according to the first level of encryption security. In some embodiments, the method includes associating, with the electronic document, data indicative of the encrypted at least one portion of the electronic document.

In some embodiments, the method includes removing the at least one portion of the electronic document from the electronic document such that information indicative of the at least one portion of the electronic document is only accessible via the associated data. In some embodiments, the removing is carried out by deleting, from the electronic document, content included in the at least one portion. In some embodiments, the removing is carried out by replacing the at least one portion with a field configured to indicate in an electronic display of the electronic document, such that the at least one portion is only viewable upon decryption.

In some embodiments, the removing is carried out by replacing the at least one portion with a raster image indicative of content included in the at least one portion. In some embodiments, the raster image is situated within the electronic document at the same location as the at least one portion and has pixelated dimensions similar to the replaced at least one portion such that a paragraph formatting of the electronic document is maintained, relative to an original version thereof, responsive to the removing. In some embodiments, the raster image is a reproduction altered image configured to be embedded with a latent image discernible to the unaided eye only with a viewing aid, in an original printed version of the electronic document, and which latent image is not discernible with the same viewing aid in a reproduction of the original. In some embodiments, the associating is carried out by including, within a data payload of the electronic document, the encrypted data and an encrypted version of the raster image which is encrypted according to the first level of encryption security. In some embodiments, the removing is carried so as to maintain a paragraph formatting of regions of the electronic document surrounding the at least one portion. In some embodiments, the method includes storing the electronic document and the associated data indicative of the encrypted at least one portion of the electronic document. In some embodiments, the associating is carried out by appending a pointer to the electronic document. In some embodiments, the pointer indicates a location at a remote server storing the encrypted data. In some embodiments, the associating is carried out by appending, within a data payload of the electronic document, the encrypted data.

In some embodiments, the method includes identifying a second at least one portion of the electronic document configured to be rendered in a second color associated with a second level of encryption security. In some embodiments, the method includes encrypting the second at least one portion of the electronic document according to the second level of encryption security. In some embodiments, the method includes associating, with the electronic document, data indicative of the encrypted second at least one portion of the electronic document. In some embodiments, the method includes identifying a third at least one portion of the electronic document configured to be rendered in a third color associated with a digital security feature other than an encryption security feature. In some embodiments, the method includes generating a security feature based in part on the third at least one portion of the electronic document. In some embodiments, the method includes associating, with the electronic document, data indicative of the generated security feature.

In some embodiments, the method includes receiving authentication information. In some embodiments, the method includes determining whether to allow access to the data indicative of the at least one portion of the electronic document based on the authentication information. In some embodiments, the method includes revealing the contents of the at least one portion or an associated raster image associated responsive to determining that access is allowed. In some embodiments, the determining includes receiving an authentication key.

In some embodiments, the electronic document is specified by a data file written in a markup language. In some embodiments, the identifying is carried out by culling color specifying information from tags embedded within the markup language file.

According to some aspects of the present disclosure, a method of embedding a security feature in an electronic document is disclosed. In some embodiments, the method includes identifying a portion of the electronic document having a first color associated with a first security feature. In some embodiments, the method includes generating a digital security feature based in part on the contents of the identified portion. In some embodiments, the method includes associating data indicative of the generated security feature with the electronic document. In some embodiments, the method includes generating a raster image file configured to be printed as an embedded printed security feature in a printed version of the electronic document. In some embodiments, the raster image file corresponds to the digital security feature. In some embodiments, the raster image is a reproduction altered image.

According to some aspects of the present disclosure, a processing system configured to operate to achieve any of the methods described herein is disclosed.

According to some aspects of the present disclosure, a system for generating an electronic document with selectively-secured contents is disclosed. In some embodiments, the system includes a processing system configured to: identify a portion of an electronic document selected for security processing; generate a digital security feature based on the identified portion of the electronic document; associate data indicative of the generated digital security feature with the electronic document; generate a raster image configured to be printed as an embedded printed security feature in a printed version of the electronic document; and associate the generate raster image with the electronic document. In some embodiments, the system includes a user interface configured to allow a user to view and manipulate the electronic document according to user inputs. In some embodiments, the user interface is configured to allow the contents of an electronic document to be rendered in a color associated with a security feature. In some embodiments, the system includes an optical scanning system configured to receive one or more physical documents and generate one or more data files indicative of the contents of the one or more physical documents.

In some embodiments, the system includes a printing system configured to generate an original printed version of the secured electronic document. In some embodiments, the system is configured to cause the original printed version to be printed with the generated raster image in place of the identified portion of the electronic document. In some embodiments, the digital security feature is an encryption security feature and the processing system is further configured to encrypt the content of the identified portion. In some embodiments, the generated raster image is a reproduction altered raster image having hidden contents embedded in a latent image thereof. In some embodiments, the latent image is indicative of the content of the identified portion of the identified document. In some embodiments, the processing system is further configured to encrypt the generated raster image and to embed the encrypted content and image files within a data payload of the electronic document. In some embodiments, the processing system is configured to encrypt the generated raster image and to store the encrypted content and image files at a remote server with a location indicated by a pointer associated with the electronic document. In some embodiments, the system is configured such that the generated electronic document includes the generated raster image, in place of the identified portion. In some embodiments, the raster image is configured to be printed as an embedded security feature on a physical printed version of the generated document. In some embodiments, the processing system is configured to generate distinct security features according to a color of the identified portion.

According to some aspects of the present disclosure, a system for generating a secured document is disclosed. In some embodiments, the system includes an identifying module configured to receive an electronic representation of a document bearing color identification information, and to identify at least one portion of the electronic representation of the document rendered in a color associated with a security feature. In some embodiments, the system includes a digital security module configured to generate a desired digital security feature based on the text content of a portion of the document and the color of the text content or the color of the background of the portion. In some embodiments, the system includes an image generation module configured to generate a raster image configured to be embedded as a printed security feature in an original printed version of the electronic representation of the document. In some embodiments, the system includes a pattern recognition module configured to: receive an electronic representation of a document, recognize patterns within content or layout of the document corresponding to portions of the document selected for security processing, and modify the colors of the content or background of the recognized portions of the document such that the recognized portions are rendered in colors associated with desired security features.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
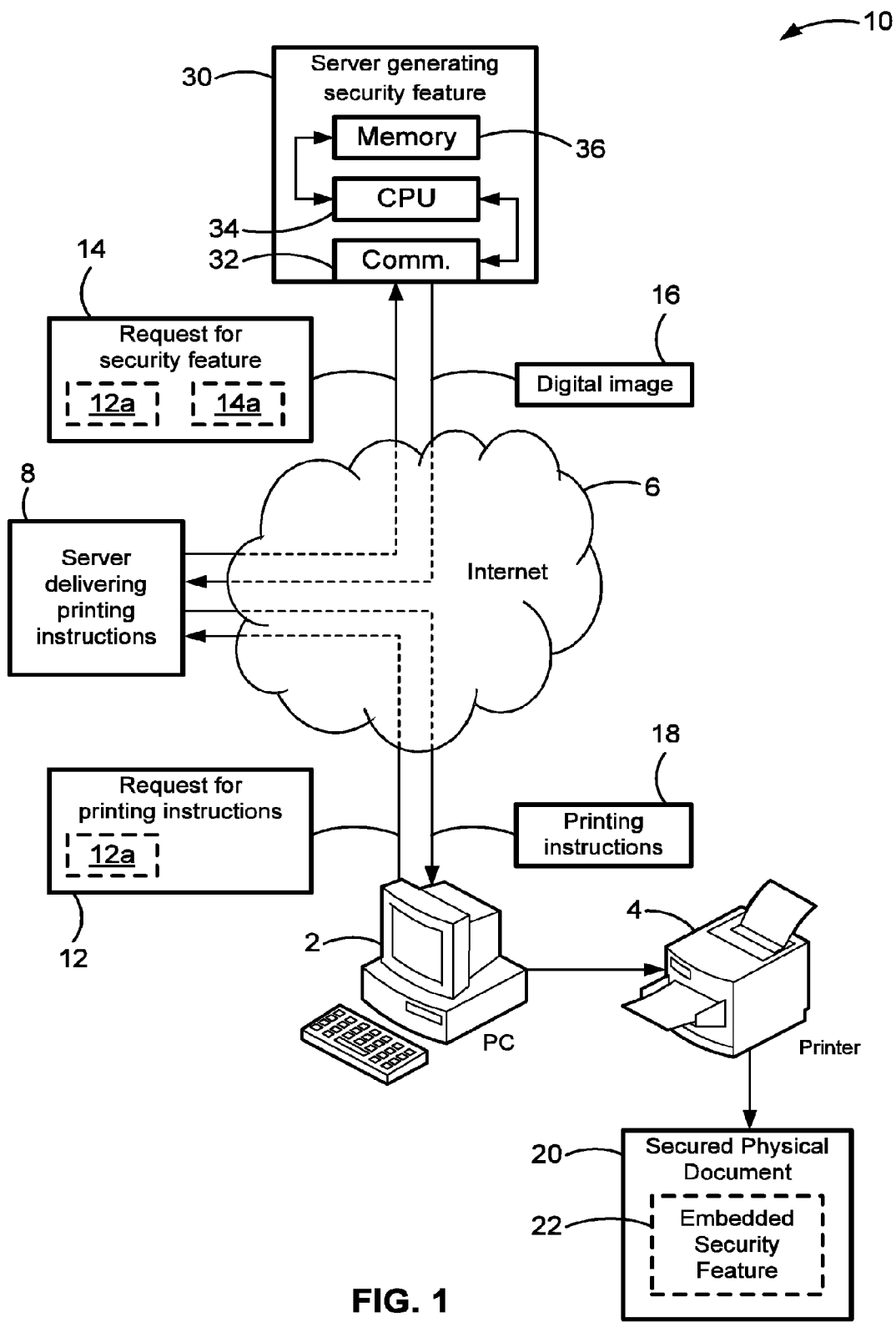
FIG. 1 is a block diagram of an example system for allowing a consumer to print an authenticated physical document incorporating dynamically embedded security features delivered via the internet.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a block diagram of an example system 10 configured to allow a user to print an authenticated ("secured") physical document 20 incorporating one or more dynamically embedded security features 22 delivered via the internet 6. The system 10 includes a personal computer 2 having a user interface for displaying content and receiving user inputs. The personal computer 2 is communicatively coupled to a printer 4. In some embodiments, a remotely located first server 8 is configured to deliver printing instructions 18 in response to a request 12 from the computer 2. In some embodiments, the printing instructions are utilized by the computer 2 and/or printer 4 to cause a physical secured document 20 to be printed on the printer 4. In some embodiments, the secured document 20 incorporates an embedded security feature 22, which is dynamically generated by a second server 30 communicatively coupled to the first server 8 for delivering a digital image indicative of the embedded security feature.

According to some embodiments, the computer 2 can be communicatively coupled to the printer 4 via parallel, USB, serial, or wireless connection technologies. In some embodiments, the printer 4 is a consumer-level printer system that is commercially available through, for example, an office supply store or similar venue for purchasing electronics for home use. In some embodiments, the printer 4 can be, for example, an ink jet printer or a laser jet printer, and can produce physical printed documents with resolutions of approximately 300 to 600 dots per inch. Additionally or alternatively, the printer 4 can produce physical printed documents with resolutions exceeding 600 dots per inch. In some embodiments, the computer 2 includes an internet connection port (not separately shown) for coupling the computer to the internet 6 or other network via signals to send data packets to and/or from the computer 2 and one or more of the remotely located servers 8, 30.

In some embodiments, the first server 8 can be configured as a web-based printer driver that is operative to provide instructions 18 to the computer 2 for printing the secured physical document 20 via the printer 4. In some embodiments, the first server 8 can communicate with a printer driver software module preinstalled on the computer 2. Such a printer driver software module can be configured to provide printing of documents where externally controlling features of the printing process is desirable. For example, such a preinstalled printer driver module can be configured to only allow printing a limited number of copies (e.g., one copy) of a particular document.

In some embodiments, the remotely located first server 8 is configured to receive a request ("query") 12 for printing instructions from the computer 2. The request 12 for printing instructions can optionally be initiated in response to a user input on the computer 2, such as, for example, entering one or more key strokes or selecting a selectable region of a graphical user interface. Additionally or alternatively, the first server 8 can be configured to send instructions to the computer 2 without any relation to a user action, such as at a predetermined interval or in response to an external action or signal that is not associated with the computer 2 or its user.

In some embodiments, where the request 12 is transmitted to the first server 8, a data load embodying the request can optionally include customization data 12a. The customization data 12a can include, for example, indicators specifying information about the printer system 4 (e.g., type, model, manufacturer, etc.) communicatively coupled to the computer 2. Additionally or alternatively, the customization data 12a can include indicators specifying the content of the secured document being requested, which can be, for example, indicators specifying or information concerning the secured and/or unsecured portions of the document. Additionally or alternatively, the customization data 12a can include indicators of identifying information and/or information specifying features of the computer 2 and/or its user, and such data can optionally be provided covertly (i.e., without indicating its transmission to such a user).

According to some embodiments, the first server 8 generates signals indicative of printer instructions 18, which can be information adapted to communicate directly with a printer in a printer-specific language, e.g., XPS file type, or can be signals that allow a software printer driver module to create printer language instructions to cause the printer 4 to print the physical secured document 20. According to some embodiments, the first server 8 is configured to deliver instructions 18 for printing the secured document 20. In order to enhance the security of the resulting printed document 20, however, the first server 8 communicates with the security image dynamic generation second server 30, via, for example, the internet 6 or other network, to receive digital images suitable to be integrated in the secured document 20 as the embedded security features 22. In some embodiments, the embedded security features 22 are reproduction altered regions, which will be explained further herein below.

In some embodiments, the first server 8 sends a request 14 to the second server 30 including a data payload including information indicative of a security feature to be generated by the second server 30. The request 14 can include information from the request 12 sent by the computer 2, or portions thereof. For example, the request 14 can include some or all of the customization data 12a, or can include data derived in whole or in part from the customization data 12a. The request 14 can additionally or alternatively include additional customization data 14a which is provided by the first server 8 to further specify the contents and/or generation parameters of the requested security feature. In some embodiments, the additional customization data 14a can include information specifying the identity of the first server 8 or specifying other information useful for diagnostic and/or forensic purposes.

According to some embodiments, the second server 30 is configured to generate a digital image 16 incorporating reproduction-altered security features based on the received request 14. The second server 30 includes a communication interface 32 for sending and receiving signals to and from the second server 30. According to some embodiments, the server 30 includes a processor 34 and a memory module 36. According to some embodiments, the processor 34 is communicatively coupled to both the memory 36 and the communication interface 32. The second server 30 receives the request 14 and its associated data payload via the communication interface 32. According to some embodiments, the processor 34 operates to construct a digital image based at least in part on the received data 14. The resulting digital image is configured to be integrated in the printed document 20 as the embedded security feature 22. In some embodiments, the generation of the digital image via the processor 34 is carried out by generating one or more foreground features comprising a line screen pattern. In some embodiments, the processor 34 also generates a background pattern comprising an array of lines, dots, elements, irregular shapes, non-uniform features, and/or one or more line screen patterns. Examples of the features of the background and foreground of the generated digital image 16 will be described further in connection with the examples described in connection with FIGS. 3A and 3B.

As used herein, a line screen pattern is generally a pattern including parallel, narrow lines that are characterized by (at least) a line frequency. The line frequency of a line screen pattern is a spatial frequency characterizing the number of lines per inch (LPI) in a particular line screen pattern. The line frequency can be measured by, for example, measuring the number of lines traversed along a direction perpendicular to the orientation of the lines in the line screen pattern, and then dividing the measured number of lines by the distance traversed. The line screen pattern can be generated with line thickness such that the amount of space between lines in the pattern is equal to the amount of space occupied by the lines (e.g., the distance between nearest sides of adjacent lines is nearly equal to the thickness of the lines). Additionally or alternatively, the line screen pattern can be generated with lines having a standardized line thickness determined to provided desirable results with a particular printing system and/or reproduction system. Additionally or alternatively, the line screen pattern can be generated with lines having a minimum achievable line thickness. In some embodiments, the minimum achievable line thickness can be achieved by utilizing a primary color from the printing system in order to avoid utilizing mixed colors, which may thicken the lines. In some embodiments, the minimum achievable line thickness will be influenced by characteristics of a printing system, such as, for example, the resolution (dots per inch) of the printing system.

According to some embodiments, one or more image generation settings can be adjusted based on the identity of the printer system 4 to provide desirable results. In some embodiments, the image generation settings can be empirically determined by, for example, testing a range of possible combinations of image generation settings on a variety of different printer systems and identifying the printer settings that work best. Additionally or alternatively, once a subset of printer systems expected to be employed in the system 10 have been tested and desirable image generation settings have been determined, conclusions can be drawn regarding a remainder of printer systems expected to be utilized in the system 10. Indications of the printer systems and their corresponding determined image generation settings can then be stored in the memory 36 of the second server 30. Such information can be stored using, for example, a look up table to associate identified printer systems (or classes, types, or manufacturers thereof) with one or more image generation settings empirically determined to produce desirable results for those printer systems. Additionally, the memory 36 can store default image generation settings to be used to generate the digital image 16 when no printer system is specified by the data payload of the request 14, or when the identified printer system is not included in the lookup table.

The second server 30 transmits signals indicative of the digital image 16 back to the first server 8 via the internet 6 to be incorporated in the printing instructions 18 returned to the computer 2 by the first server 8. The digital image 16 can be transmitted as a raster image file (e.g., PNG, JPG, BMP, etc. file types) or can be transmitted as a vector image file (e.g., EPS, etc.), or can be transmitted as signals indicative of either of these, such as by an encrypted message. Once the data payload 16 indicating the digital image file is returned to the first server 8, the first server 8 incorporates ("integrates") the digital image in the printing instructions 18 for the secured document and sends the printing instructions 18 to the computer 2.

Some embodiments of the system 10 illustrated in FIG. 1 thus provide functionality previously unavailable: to print documents 20 with dynamically generated embedded security features 22 on home-based ("consumer-level") printers 4 in a user's home or other location connected to the internet 6. Some embodiments of the present disclosure advantageously provide systems for generating embedded security features on documents printed via consumer level printer systems, such as, for example, printer systems creating documents with resolutions of 300 to 600 dots per inch. Some embodiments of the present disclosure advantageously include dynamically generated content, customizable content, or settings optimized for use on particular printer systems. Aspects of the present disclosure are thus applicable to a broad range of situations where electronically delivering secured documents to a user is desirable. For example, according to some embodiments local governments may endeavor to electronically deliver building permits to be posted at construction sites, and may desire such building permits, when printed via a user's consumer level printing device, to incorporate embedded security features to allow for verification of their authenticity. In another example, businesses and vendors may endeavor to electronically deliver coupons or discounts, and may desire such documents to incorporate embedded security features. Other examples will be readily apparent for applications of this technology to electronically deliver dynamically generated security features to be embedded in a printed document adapted for consumer level printing technology.

As will be described further herein with respect to an example printed document and its reproduction shown in FIGS. 3A and 3B, the nature of the embedded security features can take several forms. In some embodiments, the embedded security feature is a reproduction altered security feature. As used herein, the term "reproduction altered" is used to describe a printed field having a foreground and a background which, when reproduced, causes the foreground and background to be altered with respect to one another relative to their relationship in an original version of the printed field. In some embodiments, an embedded security feature can include a latent image in its foreground which is not readily distinguishable, with the naked eye, from a background visually integrated setting. In some embodiments, the latent image can be revealed on an original printed version with assistance of a viewing aid that is configured to allow the latent image to become distinguishable; however, upon reproduction, the latent image becomes indistinguishable from the background with the same viewing aid. Thus, some embodiments of the embedded security feature allow for information to be securely embedded within a document, only readily revealed with assistance of a particular viewing aid, and for the information to be effectively destroyed upon reproducing ("copying") the document.

In some embodiments, the embedded security feature can include a latent image that is not readily distinguishable from its surrounding background in an original printed version, but which becomes distinguishable in a reproduction of the original. As used herein, a reproduction generally refers to a physical copy of an original printed document reproduced using optical scanning technologies. In some embodiments, the embedded security feature can include a latent image that is not readily distinguishable from its surroundings in an original printed version, but which becomes distinguishable in an electronic display ("visual facsimile") of an optically scanned version of the original printed document. For example, an electronic display can be employed to display, for example, barcodes for electronically delivered tickets, boarding passes, etc., on portable electronic devices such as phones, personal digital assistants, tablet computing devices, and/or mobile computer screens. Examples of some reproduction altered embedded security features are disclosed, for example, in commonly assigned U.S. patent application Ser. No. 11/839,657, filed Aug. 16, 2007, and published as U.S. Patent Publication No. 2008/0048433 on Feb. 28, 2008; U.S. patent application Ser. No. 11/744,840, filed May 5, 2007, and published as U.S. Patent Publication No. 2007/0257977 on Nov. 8, 2007; and U.S. patent application Ser. No. 11/495,900, filed Jul. 31, 2006, and published as U.S. Patent Publication No. 2007/0029394, the contents of each of which are hereby incorporated herein by reference in its entirety.

For purposes of assisting in clarifying the present disclosure, a non-limiting example is described next. In some embodiments, the system 10 can be utilized to provide internet based electronic delivery of printed coupons bearing embedded security features. For example, the request 12 can be for printing instructions for a coupon delivered electronically by a vendor such as, for example, a vendor seeking to increase interest in its products and to target delivery of its promotional materials via the internet 6. The request 12 can optionally specify a particular coupon to be printed, which can be, for example, selected from a vendor's website or from a website providing coupons for more than one vendor. The request 12 can additionally or alternatively specify information 12a indicating the type (e.g., laser, inkjet, etc.) of the printer system 4 peripherally connected to the computer 2. The request 12 can also optionally specify information 12a indicating information relevant for consumer marketing research, such as the age, location or state, household size, annual income, brand preference(s), shopping preference(s), phone number(s), and/or email address, etc. of the user and/or computer 2 initiating the request. Such consumer marketing information 12a can be information that is pre-collected via the website prior to the user selecting a particular coupon for printing. The request 12 can additionally or alternatively specify information 12a indicating the network provider, MAC address, and/or IP address, etc. of the computer 2 and its associated internet network connection port(s). Such internet connection information 12a can be used diagnostically and/or forensically to diagnose potential problems with network connectivity, service delivery, and/or unauthorized use of the remote first server 8 to, for example, print more copies of delivered coupon(s) than authorized.

Upon receipt of the request 12, the first server 8 conveys the request 14 to the second server 30 for generation of the digital image 16. The request 14 can optionally specify the size (e.g., pixel dimensions), the content, and/or one or more image generation parameters of the digital image 16 to be generated by the second server 30. For example, the request 14 can specify the IP address associated with the computer 2 (or other identifying information associated with the user of the computer 2) and the digital image 16 can include the IP address as a latent image viewable with assistance of a viewing aid. In this manner, according to some embodiments, a user of the computer 2 is unaware that the printed coupon 20 includes information indicating their IP address in the embedded security feature 22, and the IP address information can be recovered by the vendor upon receipt of the printed coupon 20 and then can be optionally recorded to be used for diagnostic, research, and/or forensic purposes. In one implementation, the identifying information (e.g., IP address) can be utilized by a coupon vendor to determine that unauthorized numbers of the printed coupons have been created, e.g., due to flaws in the embedded security feature or in a secured software printer module installed on the computer 2. In addition, the second server 30 can generate a digital image 16 which authenticates the secured document 20 as an original by causing reproductions thereof to be altered with latent images not distinguishable on the original. The latent images can include words such as, for example, "unauthorized copy," "void," etc., which are only distinguished from their respective integrated background settings in reproductions of the original printed version of the digital image. By incorporating latent images that are readily distinguishable predominantly on reproductions of the original version, the embedded security feature 22 provides an indication of authenticity of the secured document 20 that allows it to be verified as an original. In other words, reproductions of the secured document 20 will be identifiable by the distinguishable latent image apparent in unauthorized reproductions of the embedded security feature 22.

According to some embodiments, the embedded security feature 22 is a latent image embedded within a visually integrated setting such that the latent image is distinguishable in a reproduction of an original printed version, but not in the original. The latent image can be a character or symbol that is filled with a line screen pattern having a particular line frequency, orientation, and print density; and the background visually integrated setting can be a block that surrounds, but does not overlap, the foreground latent image and is filled with a background fill. The background fill can be, for example, a patterned array of dots or elongated marks, or can be a line screen pattern having parameters (e.g., line frequency, orientation, and/or print density) that differ from the foreground latent image. According to some embodiments, the background fill can be a line screen pattern having a similar print density and line frequency to the line screen pattern of the foreground latent image, but which has an orientation rotated with respect to the orientation of the line screen pattern of the foreground latent image. For example, the relative orientations of the line screen patterns in the foreground, and background, respectively, can be approximately 90 degrees.

It has been discovered that in some implementations providing a background line screen pattern oriented at 45 degrees relative to a paper feed direction of a printer system 4 and a foreground line screen pattern oriented at 135 degrees, provides superior results under conditions when ink or toner of the printing system 4 is running low. Under conditions when ink or toner of the printing system 4 is running low, resulting printed documents (e.g., the secured physical document 20) can be rendered with streaks and/or areas of non-uniformity due to the reduced ink/toner levels. In addition, because the ink in many printing systems is not applied to the paper (or other printed media) in precisely formed dots, but rather in elongated ovals which can be shaped in part due to the direction of travel of the paper, the relative contrast of the foreground with respect to the background can be influenced by the orientation of the line screen patterns in the background and foreground. For example, where the foreground line screen pattern is generated with an orientation of 0 degrees with respect to the paper feed direction and the background line screen is generated with an orientation of 45 degrees, the line screen pattern oriented at 45 degrees may appear darker or lighter than the line screen pattern oriented at 0 degrees. Furthermore, these line screen orientation-dependent contrast effects are exacerbated when the ink/toner levels of the printer system are running low. In such an implementation then, when ink/toner is running low in the printer system 4, the resulting original printed document 20 may undesirably allow the latent image to be visible, which may cause a viewer of the document to question the authenticity of the document, which result may render the authenticating feature of the embedded security feature nearly useless or of diminished usefulness. Such a result, where an original printed version appears to be non-authentic due to the ability to distinguish the latent image within the embedded security feature 22, is referred to for convenience as a "false positive" result.

However, by generating the line screen patterns of the foreground and background with orientations that are complementary to one another (e.g., 45 degrees and 135 degrees), the apparent contrast of the foreground and background are similarly affected by the reduced ink levels. Utilizing complementary line screen patterns thus allows the resulting printed image to desirably retain the foreground latent image as not readily distinguishable from the background fill pattern. Thus, some embodiments of the present disclosure provide for generating a digital image 16 to be utilized as the embedded security feature 22 and which is configured to prevent the occurrence of a false positive result even while the printer system 4 experiences decreased ink/toner levels.

Referring again to the coupon example provided for example purposes above, false positives are viewed as undesirable because user frustration is predicted to result from users that print original coupons that include indicia (distinguishable latent images) identifying the coupon as non-original. Accordingly, some embodiments of the present disclosure are configured to select image generation settings empirically tested to produce very low occurrences of false positive results.

Figure 2:
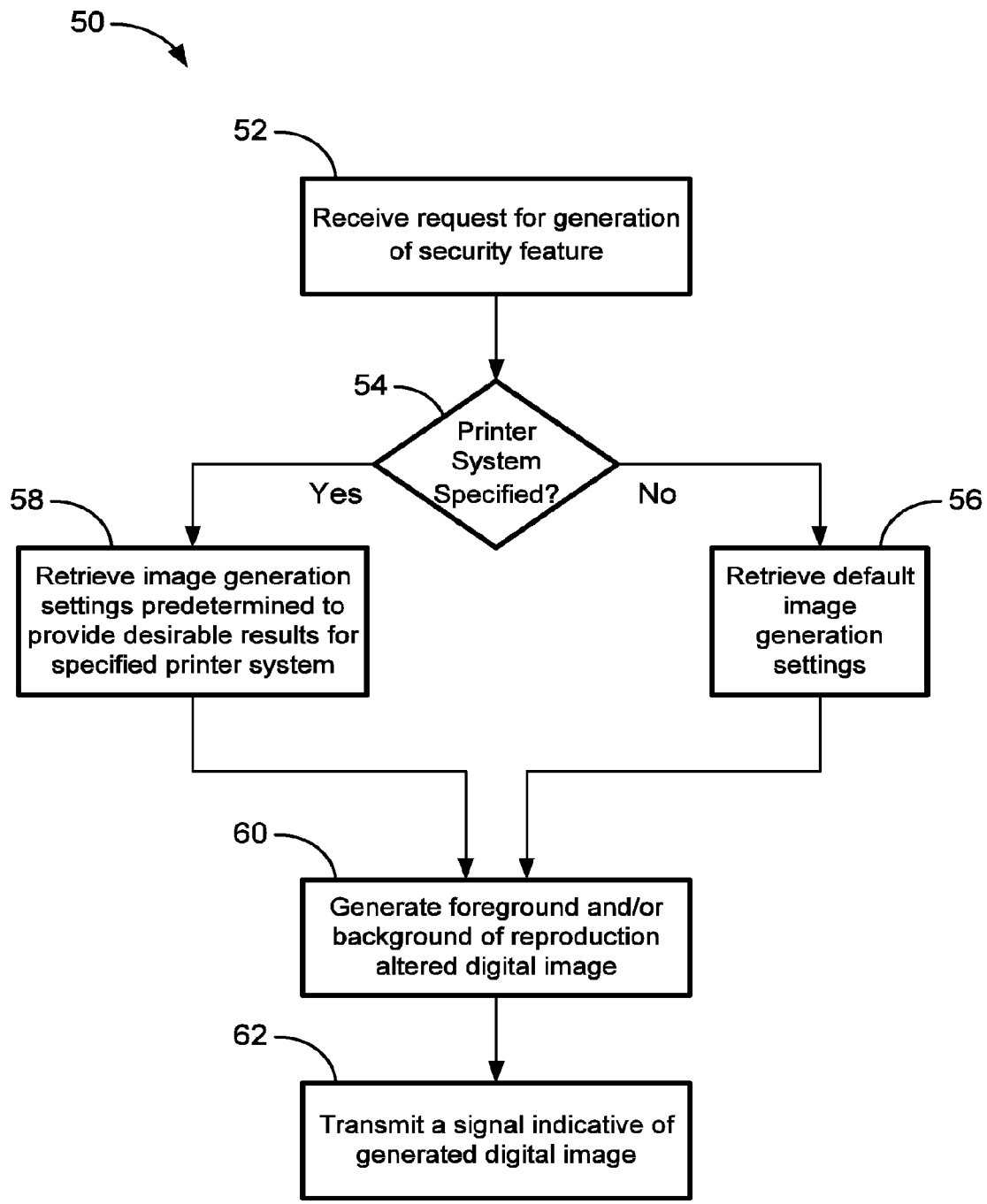
FIG. 2 is a flow chart demonstrating dynamic generation of a digital image file configured to be an embedded security feature in a physical document.

FIG. 2 is a flow chart 50 demonstrating the dynamic generation of a digital image file configured to be included as an embedded security feature in a physical document. As shown in FIG. 2, a request (e.g., the request 14 shown in FIG. 1) is received to generate a security feature (52). The data payload of the request is analyzed to determine whether the request includes data specifying a printing system (54). If no printing system is specified, default parameters ("settings") for generating the security feature(s) are retrieved (56). If a printing system is specified, parameters for generating the security feature(s) are retrieved which have been predetermined to provide satisfactory results with the specified printing system (58). Such parameters can be stored, for example, in a look up table within the memory 36 of the second server 30, with entries for various settings of print density, line frequency, etc. corresponding to various types of identified printer systems. The data payload of the request is examined further to determine whether particular content of the requested security feature is further specified by the request 14. For example, the size (e.g., pixel dimensions), desired reproducibility features, and/or desired content of any latent images in the foreground and/or background of the digital image may be indicated by the request 14. A digital image suitable for being embedded within a physical document as an embedded security feature is then generated according to the specified parameters (60). Signals are transmitted (e.g., the signals 16 shown in FIG. 1) to convey information indicative of the generated digital image to the requestor (62). The generated digital image can be generated and/or transmitted as a raster image file, such as a PNG, JPG, BMP, etc. or as a vector image file, such as EPS, etc. The signals conveying the generating digital image can optionally be encrypted to provide additional security.

Figure 3A:
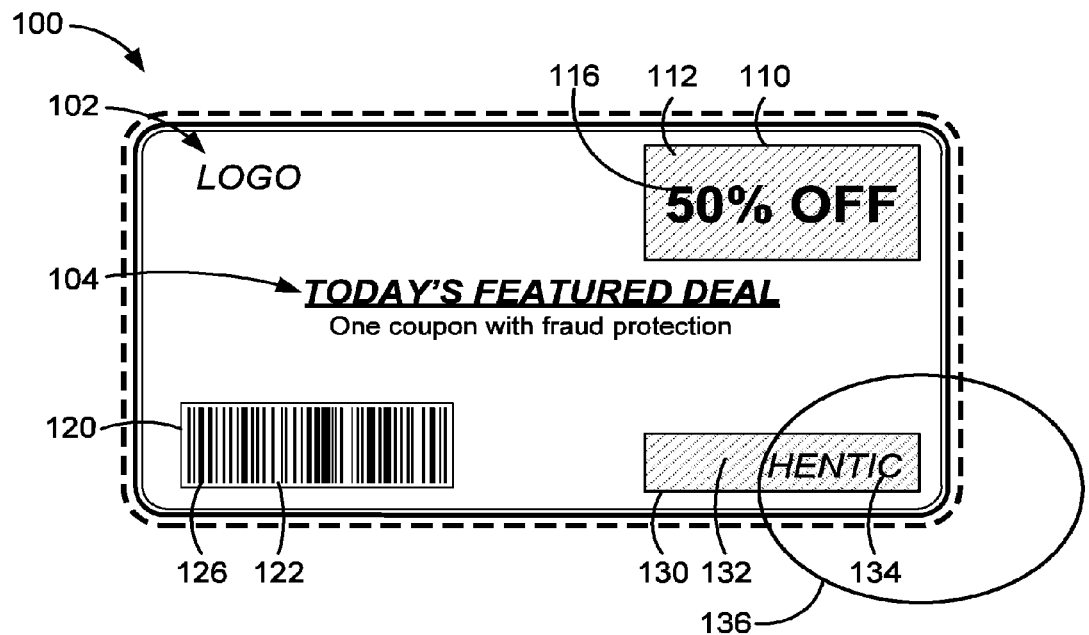
FIG. 3A is an example of a printed document having fields with embedded security features.
Figure 3B:
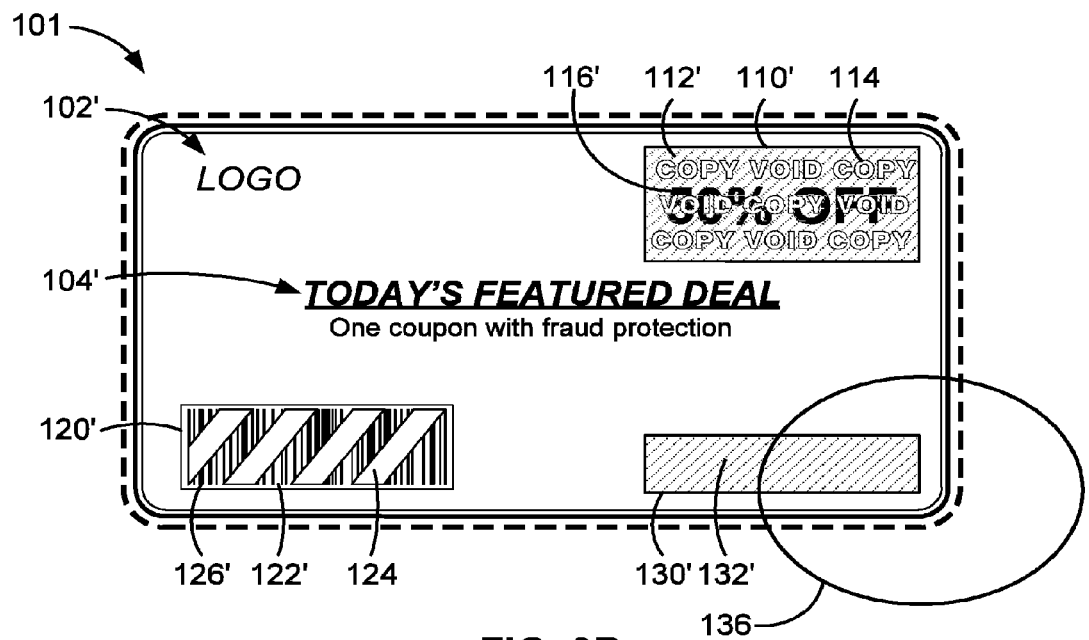
FIG. 3B is an example of a photocopy of the printed document shown in FIG. 3A where the security features have been reproduced in an altered state relative to the original.

FIG. 3A is an illustration of an original printed document 100 having fields with embedded security features 110, 120, 130. FIG. 3B is an example of a photocopy 101 of the printed document shown in FIG. 3A where one or more of the security features 110', 120', 130' have been reproduced in an altered state relative to their respective original versions. The document 100 is illustrated for example purposes as a coupon for a vendor offering a 50% reduction in the price of goods or services. The document 100 includes a number of fields. A logo 102 can be included to identify the provider of the goods or services advertised. A text field 104 can be included to further specify the nature of the goods or services advertised. The copied version of the coupon document 101 includes corresponding copies of the logo 102' and the text field 104' which are substantially unaltered with respect to the original versions (102, 104). However, as described further below, reproduction altered features are incorporated in the authentication field 110, the barcode label field 120, and the hidden content field 130.

The authentication field 110 includes the text field 116 which reads "50% OFF" overlaid on a pantograph background field 112 that includes embedded security features to reveal latent images 114 in the copy 101 of the coupon document. Other features of the authentication field 110 are reproduced in the authentication field 110' of the copied document 101, as respective reproduced versions of the background field 112' and the text field 116' (in this example, the text field 116' reads "COPY" and "VOID"), but the latent images 114 are only readily distinguishable in the copied version 101, not the original 100.

The document 100 can include the secured barcode field 120 which includes a barcode label 126 constructed from a series of elements of varying widths and spaces and which is readable by an optical barcode scanning device. Additionally or alternatively, the secured barcode field 120 can include a two dimensional pattern (e.g., a Quick Response code matrix barcode pattern). The barcode label 126 is overlaid on a pantograph background field 122 including latent images revealed in a reproduction which are designed to make the reproduced barcode field 120' unreadable by the optical barcode reading device. In some embodiments, the pantograph background field 122 can be a digitally printed field incorporating lines, dashes, dots, ovals, and/or other elements to produce a visually integrated setting rendering the latent images difficult to perceive, or even nearly impossible to perceive, with the naked eye. In some embodiments, the pantograph background field 122 can be digitally printed in black and white and/or can be printed in color (e.g., via color printing schemes such as RGB or CMYK). As shown in FIG. 3B, the latent images 124 are configured to interfere with the copied version of the barcode label 126'. The copied version of the barcode field 120' includes a copied version of the background 122' and the barcode label 126', but also includes the latent interfering images 124 which are distinguishable on the copied version 120', but not on the original 120. According to some embodiments, the latent interfering images 124 are configured to prevent the copied barcode label 126' from having any portion that can be read continuously across its width with a ⅛ or 1/16 inch height, which effectively renders the copied or scanned barcode label 126' unreadable by an optical barcode scanning device.

The secured barcode field 120 can additionally or alternatively be rendered without latent images by incorporating tints of color in the pantograph background field 122. In some embodiments, the tints of color can be incorporated as dots, or as other patterns integrated in the pantograph background field 122. In some embodiments, the color selected for the tint can be a color that is predetermined to provide additional "darkening" and/or contrast interference with the barcode label 126 such that the copied or scanned barcode label 126' is rendered unreadable by an optical bar code scanner in the reproduced barcode field 120'.

The document 100 also includes a hidden content field 130. The hidden content field includes a secure latent image 134 embedded within the visually integrated setting of the background field 132. The secure latent image in the original document 100 is viewable with an appropriate decoding lens 136. The decoding lens can be a lens, filter, and/or transmitted/virtual image that corresponds to the line frequency of the line screen pattern of the embedded latent image 134. The transmitted/virtual image can be a projection of the hidden content field 130 which is digitally or optically modified in order to reveal the secure embedded latent image 134. A copied or scanned version of the hidden content field 130' renders the hidden content indistinguishable ("unreadable") from the copied background 132' even with the same decoding lens 136, and thereby effectively destroys the hidden content in the copied document 101.

As described above, some embodiments of the present disclosure include security features generated as digital images to be incorporated as embedded security features of a printed document. While a variety of specific security features can be dynamically generated according to aspects of the present disclosure, several non-limiting examples are described next in order to clarify features of the present disclosure.

In an example, the security feature can include an image having a foreground and a background. At least one of the foreground and the background can include a line screen pattern. A line screen pattern as used herein is a region filled with regularly spaced lines. The shape of the filled region can be an alphanumeric character, icon, or other image. The line screen pattern is characterized by parameters including line frequency ("line density"), print density, line orientation, etc. One measure of line frequency is indicated by measuring a number of crossed lines per inch (or other distance measure) while traversing the lines along a direction oriented perpendicularly to the lines being traversed. One measure of print density is indicated by a volume of ink/toner applied per square inch (or other area measure). One measure of line orientation is an angular measure of a number of degrees between the lines in the line screen pattern and a length orientation of a sheet of paper. In one example, the foreground can include a latent image constructed from a line screen pattern that is difficult to perceive ("distinguish") from the background with the naked eye in an original printed version of the image, but which becomes distinguishable in a reproduced copy of the original. Such a security feature is illustrated by the authentication field 110 and reproduced copy 110' in FIGS. 3A and 3B.

To create the embedded security feature illustrated by the authentication field 110, the background for the foreground latent image (also referred to as a visually integrated setting) can be constructed from patterns of dots, lines, elements, etc. The background visually integrated setting is configured to camouflage or mask the presence of the foreground latent image embedded within the background when inspected by the naked eye. The background visually integrated setting can optionally overlap the foreground latent image, or can be limited to regions which do not overlap the foreground latent image, or can be constructed in a combination of overlapping and non-overlapping regions. In an example where the latent image is made distinguishable in a reproduced copy, the background visually integrated setting can optionally be constructed as a second line screen pattern which is distinguishable from the foreground latent image line screen pattern by line frequency, print density, and/or line orientation, etc. In some embodiments, security features which incorporate latent images within visually integrated settings become distinguishable to the naked eye only upon reproduction of an original printed version of the security feature and can be utilized to provide an indication of authenticity ("originality") of a printed document. For example, the authentication field 110 in FIG. 3A allows the coupon document 100 to be identified as an authentic original because the latent image pattern of "VOID" and "COPY" is not distinguishable from the background pantograph 112. However, the copied authentication field 110' in FIG. 3B allows the copied coupon 101 to be identified as a copied version because the latent images 114 are distinguishable from the background 112'.

Additionally or alternatively, embedded security features can be utilized to render a non-original (e.g., reproduced) version of a printed document non-functional for its intended purpose. A latent image can be embedded in a document to cause aspects of the region bearing the latent image to become obscured or otherwise altered with respect to the original to thereby render the copied version inoperable. For example, the barcode field 120 on the original document 100 includes a barcode label 126 for being scanned by an optical barcode scanning device, which is the intended purpose of the barcode label 126. The barcode field also includes latent images within the overlaid background pantograph 122 such that the reproduced copy of the barcode field 120' includes the distinguishable latent images 124. With the latent images 124 in the reproduced barcode field 120', the copied barcode label 126' is unreadable by the barcode scanning device. Thus, unauthorized copies of the printed document can be configured to include barcodes which are not able to be scanned by a scanning device, thus rendering the document ineffective for its intended purpose of being scanned by a barcode reading device. As a result an original printed version of the coupon document 100 may be scanned at a register using the barcode field 120, while a copy of the coupon document 101 will not be able to be scanned at a register due to the interfering latent images 124 that prevent the copied barcode label 126' from being scanned.

According to some embodiments, a digital image security feature for being integrated in a document includes a foreground and a background which are differentially reproduced with respect to one another. In some embodiments, the foreground can become more distinguishable, relative to the background, in a reproduction of an original printed version. On the other hand, in some embodiments, the background can become more distinguishable, relative to the foreground, in a reproduction of an original printed version. In other embodiments, a foreground image in an original printed version may be distinguishable with the assistance of a visual aid, but can be indistinguishable from the background with the assistance of the same visual aid in a reproduction of the original. Thus, some embodiments destroy information rather than allow it to be reproduced, while others allow information to be distinguished more readily in a reproduction than in its original.

With respect to the system 10 described in connection with FIG. 1, the various servers 8, 30 and computer 2 are described as being communicatively coupled via the internet 6. However, the present disclosure is not limited to systems utilizing only the internet 6, and applies to systems where communication is performed via two way communications including wired and wireless systems, such as private intranets, closed loop systems, and/or networks. Aspects of the present disclosure can also be applied to systems where secured documents are generated dynamically internal to the computer 2, and without connection to any externally located server(s). Additionally or alternatively, aspects of the present disclosure apply to closed loop systems (e.g., a kiosk such as a lottery terminal, automatic teller machine, ballot machine, etc.) which allows for generation of secured physical documents based on digitally dynamically generated, secured content. While providing generation of embeddable security features from a remotely located server can offer benefits by allowing an external operator (other than the user of the computer 2) an additional measure of control in generating the security features, the present disclosure is in no way limited to internet-based, or network-based dynamic generation of security features. For example, some embodiments of the present disclosure can be implemented to allow a user of the computer 2 to dynamically generate a document with one or more security features that include customizable content and/or are rendered according to settings pre-determined to provide desirable results on the printer system 4. In some embodiments, embedded security feature(s) can be customized for each document created.

In some embodiments, the printed security features described herein can be embedded in a printed document that also includes additional security features in order to provide two factor authentication security. For example, any of the printed security features can be combined with a document having inks printed thereon that are visible only under infrared light, X-rays, UV light, Gamma radiation, other non-visible light sources, etc. In some embodiments, the paper utilized by the consumer-level printing device can be pre-marked with ink that is visible only under a non-visible source, and furthermore the contents of the document can be made distinguishable only with assistance of a viewing aid. An example of a two factor authentication system which applies a security image to a printing medium that is only visible with UV light (or other non-visible light) is described, for example, in U.S. Pat. No. 7,976,068, which issued on Jul. 12, 2011, the contents of which are incorporated herein by reference in its entirety.

Furthermore, while the above description describes the first server 8 and the second server 30 as separate and distinct, some embodiments of the present disclosure can be implemented where the functionality of the servers 8, 30 are integrated in first server 8 to generate the printing instructions 18 having embedded security features without an additional call/request to the second server 30. Further still, some embodiments of the present disclosure can be implemented where the functionality of the servers 8, 30 are integrated in the computer 2, which can be implemented as a closed loop system, such as, for example, an implementation of the system as a stand-alone kiosk, voting booth, lottery machine, automatic teller machine, etcetera. Some embodiments of the present disclosure therefore include closed loop systems adapted to dynamically generate secured printed documents. Some embodiments allow for dynamically generated security features to be derived in part based on dynamically generated content (rather than solely from pre-determined/established content).

In some embodiments of the present disclosure, the reproduction altered images are generated according to image generation settings empirically determined to produce desirable results for particular printing system. One factor influencing the selection of the line frequency of line screen patterns in the background and/or foreground is the print resolution of the particular printing system. The range of available lines per inch to use in rendering the line screen patterns is determined at least in part based on the print resolution of the printing system employed. Generally, a higher print resolution allows for higher line frequency line screen patterns to be accurately rendered. Table 1 below provides examples of ranges of line frequencies employed in generating line screen patterns for background and/or pantograph portions of generated images according to the printer resolution dots per inch (DPI). As used herein, the term line frequency is a spatial frequency specified by a number of lines per inch (LPI). For the LPI values in the fourth row of Table 1, pairs of values are provided. The pairs of values correspond to LPI values for foreground and background, respectively. In some embodiments, the foreground and background are rendered with line frequencies that are matched according to the pairs indicated in the fourth row of Table 1.

TABLE 1

| Lines Per Inch for Different Print Resolutions for Pantograph image generation | | | | | |
|---|---|---|---|---|---|
| DPI | 300 | 600 | 1200 | 2400 | 2540 |
| LPI total range | 20-150 | 20-180 | 20-200 | 20-300 | 20-300 or higher |
| LPI recommended range | 45-120 | 45-180 | 45-200 | 45-200 | 20-200 or higher |
| LPI preferred range | 75/75 95/95 75/120 | 75/75 95/95 75/120 | 75/120 75/150 75/180 | 75/180 | 75/180 |

Additionally, the angles employed and print densities influence the choice of image generation settings. It has been discovered that foreground images can be produced with line screen patterns oriented at 0 degrees relative to a feeding direction of a printed medium. In other words, foreground line screen patterns can be oriented with the lines along a feeding direction of the printed medium. Background images, meanwhile, can be formed from a pattern including lines, dots, elements, non-continuous and/or broken line elements, irregularly shaped elements, etc. The elements forming the background images can be oriented generally at an angle of 45 degrees with respect to a feeding direction of the printed medium. At low resolutions it has been discovered that there is difficulty in blending the foreground and background due to lack of ability to make fine tune adjustments as a result of the low DPI resolution. As a result, recommended lines per inch values are significantly lower at 300 DPI printer resolutions than at 1200 DPI printer resolutions, for example.

Furthermore, it has been discovered that the print density of the foreground and background are commonly undesirably rendered with 5 to 15% difference between the two on lower DPI printing systems. This difference in print density is explained in part due to differences in orientation of the line screen patterns, and the effect of rendering the ideally continuous lines of the line screen patterns with a series of discrete dots on a print medium. This rasterization of the continuous lines which creates choppiness (unevenness) in the line screen pattern as the ideally continuous line is traced from one dot to the next to create an overall perception of a roughly continuous line, at a macro level, but the resulting micro level unevenness can lead to heavier/lighter print densities. As a result, the difference in print densities can undesirably contribute to causing a foreground latent image to be perceived with respect to the background even in an original printed version of the pantograph image. On higher DPI printing systems, the difference in print density due to the same effects is commonly only about 1% to 3%. Generally, the LPI values indicated as preferred, in the fourth row of table one, are LPI values that have been empirically identified as providing desirable results to match print densities of the background and foreground images. At print densities above 200 lines per inch, some printing systems do not provide consistent results, even with high DPI systems, and therefore such line frequencies are preferably avoided.

Table 2 below provides examples of ranges of line frequencies employed in generating line screen patterns for background and/or pantograph portions of generated images according to the printer resolution dots per inch (DPI).

TABLE 2

Lines Per Inch for Different Print Resolutions
for Hidden Content image generation

| DPI | 300 | 600 | 1200 | 2400 | 2540 |
| --- | --- | --- | --- | --- | --- |
| LPI total range | 20-150 | 20-180 | 20-200 | 20-300 or higher | 20-300 or higher |
| LPI recommended range | 45-120 | 45-180 | 45-200 | 45-200 | 20-200 |
| LPI preferred range | 75/75 95/95 100/100 110/110 120/120 | 75/75 95/95 120/120 150/150 180/180 | 75/75 95/95 120/120 150/150 180/180 | 75/75 95/95 120/120 150/150 180/180 | 75/75 95/95 120/120 150/150 180/180 |

Line screen patterns for the foreground and background images are desirably rendered with orientations at 45, 135, 225, or 315 degrees relative to a feeding direction of the printed medium. The orientations of the line screen patterns in the foreground and background are desirably oriented at 90 degrees relative to one another (i.e., perpendicularly oriented) for superior print quality that provides few false positive results. While deviations from these example orientations values is expected and fully contemplated by the present disclosure, line screen patterns with orientations at 90 degrees or 0 degrees to the feeding direction of the printed medium are avoided as those orientations have been empirically determined to provide unsatisfactory results. Similar to the discussion above in connection with Table 1, differences in print density have been discovered due to imperfections in reproducing continuous line features from raster print technology. However, these effects can be substantially reduced by utilizing line screen orientations that are complementary and symmetric about the feeding direction of the print medium. That is, a line screen pattern at 45 degrees with respect to the feeding direction is complementary to a line screen pattern at 135 degrees to the feeding direction: the two patterns are at 90 degrees relative to one another, but lines from each intersect the feeding direction of the print medium at a 45 degree angle. As a result, the effect on print density in reproducing the continuous lines of the line screen patterns is substantially the same whether for a 45 degree orientation or a 135 degree orientation. Similar to the discussion of Table 1, the line frequency values (LPI values) provided for the hidden content image generation settings in the fourth row specify both a foreground line frequency and background line frequency, in a matched pair that are preferably, but not necessarily, used together. It has also been discovered that using 40% to 80% color density inhibits reproduction of the hidden feature (latent image) at LPI values above 150.

Figure 4:
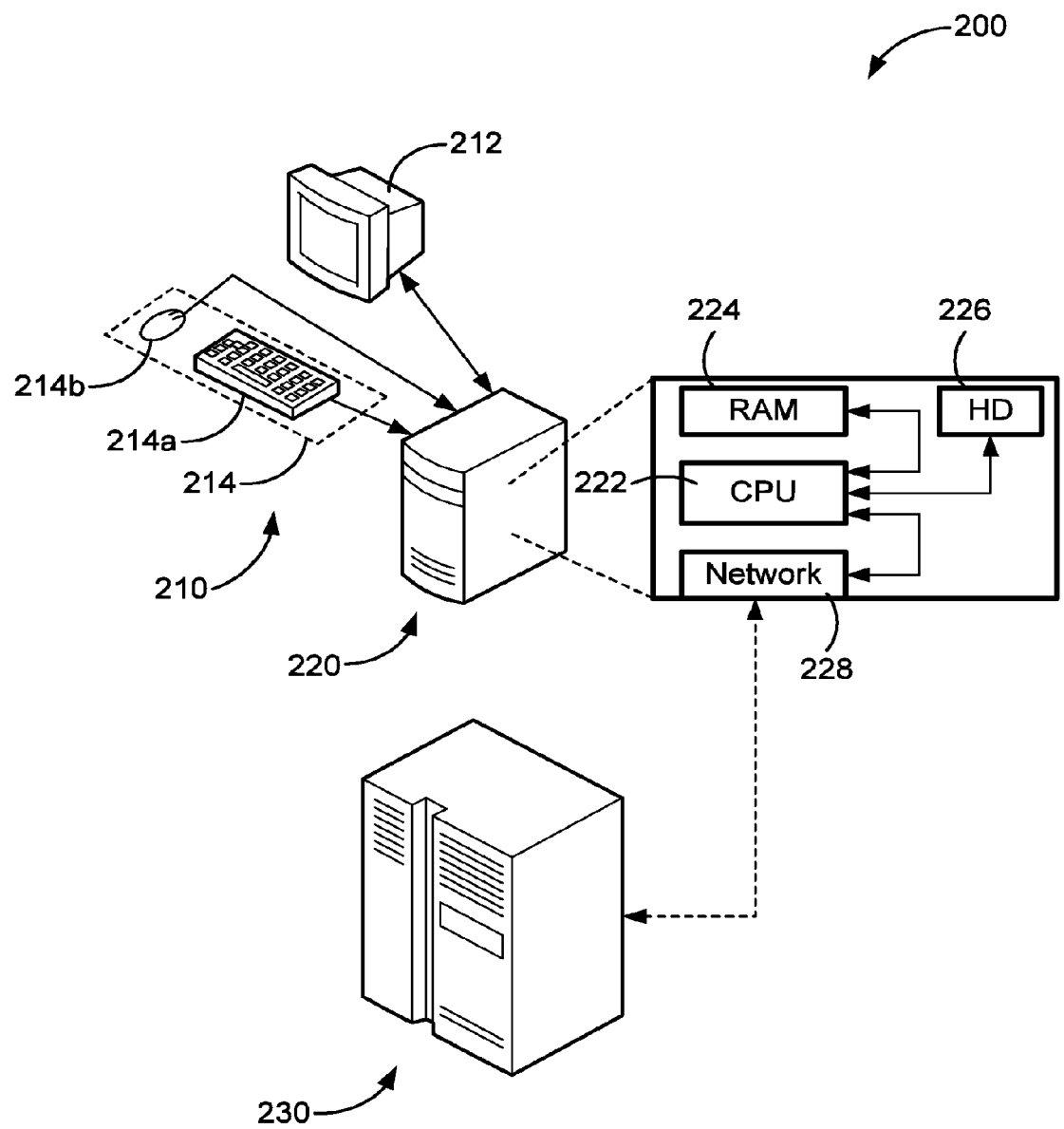
FIG. 4 is a block diagram of a system for dynamically generating security features in an electronic document.

FIG. 4 is a block diagram of a system 200 for dynamically generating security features in an electronic document. The system 200 includes a user interface 210, a processing system 220, and a remote server 230. The user interface includes a display 212 and a user input device(s) 214. The user input device 214 can be, for example, one or more depressible buttons, a keyboard 214a, a mouse 214b, a scroll wheel, a microphone (e.g., for providing voice-activated commands), biometric identification system(s) (e.g., fingerprint, facial, and/or retinal identification systems), and/or a touchscreen, etc. The display 212 can be a monitor coupled to a personal computer (e.g., the computer 2 shown in FIG. 1), can be a display screen incorporated in an electronic device (e.g., a laptop display, a display for a phone or personal electronic device, etc.). The processing system 220 includes a processor 222, a memory 224, a hard drive storage 226, and a communication port 228. The processor 222 is in electronic communication with the memory 224, the hard drive storage 226, the communication port 226, and the user interface 210. The processor 222 is configured to receive input signals from the user input device(s) 214 and to send display information to the display 212 to operate the display. The processor 222 is generally configured to operate according to machine-readable programming instructions stored in the memory 224 and according to inputs provided via the user input device(s) 214. As will be described further herein, the processing system 220 is configured to dynamically generate embedded security features in electronically stored document files. In some embodiments, the system 200 further includes the remote server 230, which includes a processor, a memory, and a communication terminal (none of which are separately shown). As described further below, the processing system 220 and the remote server 230 can be in electronic communication to allow information to be interchanged during generation of, and/or retrieval of, embedded security features in electronic documents.

As described herein, the processing system 220 can generally be implemented in a personal computer, or in a mobile personal electronic device such as a phone, personal digital assistant, music player, personal tablet device, etc. Additionally or alternatively, the processing system 220 can be implemented as a cloud-based (internet-based) service. In such a cloud-based implementation of the processing system 220, the user interface 210 can be considered a user terminal while computations are performed at a remote location with communications provided between the terminal (e.g., the user interface 210) and the remotely located processing system 220 and/or the remote server 230. It is specifically noted that in today's computation and communication environment, particular users of the user interface system 210 may not even be aware of whether particular computations are performed on a local device (such as a mobile device, phone, tablet, laptop, etc.) or on a remote, cloud-connected computing service (such as the remote server 230), or via a computing device that is coupled via a closed network and/or intranet. Additionally, it is specifically noted that while the processing system 220 and the user interface 210 are illustrated as separate systems for ease of illustration and description, aspects of the present disclosure apply to some embodiments where the user interface 210 and the processing system 220 are integrated in a single device, such as, for example, a cell phone, laptop computer, tablet device, music player, and/or other portable electronic device(s). In embodiments where the user interface 210 and the processing system 220 are provided in a single device, the user input device(s) 214 can be implemented with a touch screen, with one or more multi-function buttons, and/or microphone, etc.

In some embodiments, the hard drive 226 of the computing device can be used to store digital ("electronic") versions of electronic documents that can be viewed, edited, and/or printed via the system 200. In some embodiments, the user interface 210 is employed to view a representation of the electronic document (via the display 212) while the keyboard 214a and/or mouse 214b is used to edit the electronic document via an electronic document editing system. In some embodiments, the electronic document editing system can include, for example, document processing software, such as, for example, word processing software and/or other document viewing/manipulation software operating on the processing system 220 to edit the content, format, etc. of the electronic document. In some embodiments, the processing system 220 includes machine readable instructions (via the hard drive storage 226 and/or the memory 224) for operating document processing software to provide the desired functionality. Furthermore, the document editing system may be implemented as a cloud-based computing service (via the remote server 230) or may be implemented to divide some computational activity between the remote server 230 and the processing system 220, which is acting as a client. In any event, the user interface 210 desirable displays images indicating the current content, format, etc. of an electronic document, and generally includes selectable menus to further edit the content, format, etc. of the electronic document via the user input device(s) 214.

As used herein, an electronic document is generally an electronically stored file in a format configured to be edited, viewed, and/or printed. Examples of electronic documents applicable to embodiments of the present disclosure include the non-exhaustive list of file formats including file types associated with Microsoft Office software suite (Word, Excel, Powerpoint, Vizio, etc.), Open Office software suite, Apple productivity software suite files, Adobe editable document formats, etc. Additionally, electronic documents may be manipulated in portable document format (PDF file types), XML Paper Specification (XPS file types), and documents stored as page description languages, such as printer command language file types (e.g., PCL 5, PCL 6, etc.) and/or post script file types (e.g., EPS, PS, etc.). Accordingly, in some embodiments, the document editing system described above, including the word processing system(s) and/or other document viewing/manipulation software desirably are configured to view and/or manipulate electronic documents configured as one or more of the above-described file formats. Advantageously, the electronic documents referred to herein according to some embodiments are configured at least partially as mark up files, rather than as pure raster files. Mark up files are files which include tags (also referred to as glyphs, hashs, etc.) to specify the contents, format, etcetera of particular portions of a document. On the other hand, a raster file is a file type associated with image files, which can be considered an array of pixel values, each pixel value being specified by one or more grayscale brightness (or darkness) values.

In an example of a color image, the array of values can include three numbers for each pixel location, with each of the three values corresponding to an amount of color content from primary colors, such as red, green, and blue (RGB), or such as cyan, magenta, yellow, and black (CMYK). Some embodiments of the present disclosure utilize electronic documents defined as markup files, which generally allows the contents of the electronic document (e.g., text strings, images, etc.) and the formatting associated with various contents (e.g., page location within a document, font color, font type, font size, font weight, background color, paragraph formatting, etc.) to be retrieved from the file type without resorting to optical character recognition ("OCR") technology to reconstruct text string content from raster images. In addition, mark up files generally require less storage space and are more readily edited via a word processing software program or other document viewing/manipulation software program to, for example, change or specify a color for a particular string of text within the document.

In some embodiments of the present disclosure, portions of an electronic document that are desired to be modified with security features are indicated by tagging the desired portions with particular color(s) that is/are associated with desired security feature(s). Utilizing color as a tagging mechanism to identify regions and/or portions of an electronic document to be modified according to digital security technologies advantageously allows aspects of the present disclosure to be applicable to virtually any editable document format which allows for specifying font color, background color, and/or highlighting color, etc. in order to associate particular colors with particular portions ("subsections") of the electronic document. In some embodiments, font color, background color, and/or highlighting color of the electronic document can be specified according to contributions from constituent colors (e.g., RGB or CMYK specified colors). In some embodiments, font color, highlighting color, and/or background color are specified with red, green, and blue color values (RGB), and each of the RGB color values can range from 0 to 255 (8-bit color). For example, the number of possible color choices is given by the product of the number of possible values for each of the red, green, and blue constituent values, i.e., $(2^8)^3=2^{24}=16,777,216$ possible color values. In some embodiments, therefore, particular ones of the possible color values can be pre-associated with particular digital security features and such information can be stored, for example, in the hard drive storage 226 and/or in the server 230.

In some embodiments, colors utilized to tag portions of the document for receiving digital security features are colors which are not otherwise commonly utilized generally in document production. For example commonly used colors, such as, for example, pure blue (RGB=0, 0, 255), pure red (RGB=255, 0, 0), black (RGB=0, 0, 0) are commonly employed within documents for reasons unrelated to tagging information for further processing (e.g., pure blue can be used to indicate a hyperlink). Additionally, colors appearing as default options within a word processing, or other document, software suite "color palate" or as one of a menu of selectable colors may be viewed as too commonly occurring and therefore likely to create confusion. Thus, colors utilized to identify portions of document for digital security features can be selected to avoid commonly occurring colors. Additionally or alternatively, some embodiments can utilize colors for tagging portions of an electronic document which have distinct RGB values from commonly occurring colors, but which are not readily perceptible as different. In some embodiments, colors utilized to tag content for security features can be chosen to have RGB values that differ from commonly utilized colors by only one digit or other small, unnoticeable amount, (e.g., by incrementing or decrementing only one of the red, green, or blue color contents of the color, relative to the commonly utilized color). For example, while black is commonly utilized within document production, a nearly black color with an RGB color value of 1, 0, 0 or 0, 1, 0 is not commonly occurring. Some embodiments may prefer such a nearly black color to tag content for security features because the nearly black color, when displayed, is nearly or even entirely imperceptibly different from the black (RGB=0, 0, 0) content. However, such a nearly black color is readily discernible by a processing module (e.g., the processing system 220) configured to identify the colors specified within the markup language file that specifies the contents, formatting, etc. of the electronic document.

While aspects of the present disclosure apply to various digital security features to be incorporated in electronic documents and/or electronic documents configured to be printed as physical printed documents, particular security features are described next. In some embodiments, electronic documents are generated with security features that are analogous to the embedded security features generated in the printed documents described above in connection with FIGS. 1-3. Digital security features discussed further herein include, but are not limited to, encryption techniques and hash algorithm authentication techniques. These two examples are described next before more specific examples are discussed in connection with the flowcharts in FIGS. 5-12.

Encryption technologies are utilized to transform digital data to an altered form that is not readily readable through a mathematical operation based in part on the original data and one or more "keys." The encrypted data is rendered readable again upon decrypting the altered data. User authentication schemes, which can be implemented in hardware and/or software on the system 200, provide the ability to authenticate, encrypt, and decrypt digital data. Generally, while a host of encryption technologies are available, encryption techniques can be described as symmetric or asymmetric. Symmetric encryption is based on a secret ("private") key that is shared by both communicating parties. The party creating an encrypted message uses the secret key as part of the mathematical transformation to encrypt the original data. The reading party uses the same secret key to decrypt the encrypted data back to its original form. Asymmetric encryption is based on the two communicating parties using different keys: one key is a private key, the other is a public key that corresponds to the private key and accessible to anyone. The creating user encrypts the data using the public key. The reading user is then required to use the private key to decrypt the data. The public/private key pairs can be exchanged in various forms, such as, for example, secure certificates, on portable USB drives, or can be stored on a trusted key server. In addition, encryption technologies allow for different users to have different access based on their respective keys, or their respective authentication access level. Various encryption security standards exist, and in some embodiments, encryption can be performed according to Advanced Encryption Security standards (AES-256). Thus, encryption security allows portions of a document to be securely stored with distinct portions of the document accessible to different users, depending on the users' level of authentication.

Encryption security can therefore be considered analogous to the hidden content field 130 described in connection with FIGS. 3A and 3B above, because in both technologies, information is securely stored and retrievable only with assistance of a proper key. In the authentication field printed security feature, the securely stored information corresponding in some respects to encrypted digital data is the latent image, and the encryption key necessary to decrypt the digital data corresponds in some respects to the decoding lens 136. Furthermore, similar to the ability to encrypt data with distinct access levels each requiring separate keys for decryption, latent images within the hidden content field 130 can be generated with varying line frequencies such that each is rendered visible only with an appropriately matched viewing aid. For example, a viewing aid that provides a line interference pattern of 120 lines per inch may be ineffective to view a latent image rendered with a line screen pattern of 85 lines per inch. Thus, multiple viewing aids ("decoding lenses") allow multiple levels of security access to the contents of a physical printed document, while multiple access keys (or authentication levels) allow for multiple levels of security access to digital data in an electronic document.

Hashing algorithms can be considered a one-way encryption to generate an electronic watermark of a document. A hashing algorithm can be used to mathematically generate a hash value based on one or more keys. Preferably the keys used to generate the hash value are system specific (e.g., derived from a serial number from a USB drive of the processing system 220) and/or file specific (e.g., derived from the contents of the electronic file itself). The hash value can then be securely stored as an encrypted payload within the electronic document or can be remotely stored (e.g., on the remote server 230). In some embodiments, the electronic document can have a secure payload appended to the electronic document itself that is configured to recalculate the hash value upon copying or re-saving the electronic document. Upon copying the document, the secure payload can compare the newly generated hash value to an original value and determine whether the version is an authenticated one or not based on whether the hash values match. In some embodiments, the secure payload can be configured to modify the electronic document and/or alert a remote server in the event that the document is not an authorized version (or not an original version). In some embodiments, the secure payload can be utilized to partially destroy secured content in an unauthorized version of an electronic document and/or to digitally watermark the electronic document and any printed versions thereof to indicate that the electronic document (or a corresponding printed version) is not an authorized version (or an original version).

In some embodiments, the hash algorithm security features described herein are utilized to determine whether a particular version of an electronic document is an authorized version. For example, the hash algorithm security feature can be implemented by determining whether a user is authorized to copy and/or generate a new and/or edited version of the electronic document, which can be determined, for example, based on a user's authentication or access level. If a user is authorized to edit or copy the document, then, upon saving the edited version, the hash algorithm security feature can, for example, update the previously stored hash values or supplement the previously stored hash values with the newly generated hash value. Thus, the particular version of the electronic document can be subsequently examined to determine whether it is an authorized or non-authorized version.

Hash algorithm authenticity verification technologies can therefore be considered digital security analogs of the printed security authentication field 110 described above in connection with FIGS. 3A and 3B. Similar to the authentication field 110, which provides an indication that a reproduction of a printed document is not an original version, the hash algorithm security technology can identify an unauthorized copy/version of an electronic document. Furthermore, the printed security authentication field 110 (and the barcode field 120) are configured such that reproductions of the respective fields 110, 120 are altered so as to render the fields unusable (e.g., by indicating that the reproduction is "VOID" or by rendering a barcode unreadable by an optical scanner). Similarly, a secure payload within an electronic document can be configured to modify and/or destroy portions of the electronic document upon determining that the document is an unauthorized version of the original electronic document. For example, sensitive information subject to other security features, such as encrypted information, can be removed ("deleted") entirely. Additionally or alternatively the secure payload can modify the electronic document by adding discrete tags or header information to allow the document to be identified as an unauthorized copy and, for example, prevent the document from being printed, prevent the document from being edited, send an alert to a remote server, and/or modify/destroy barcode labels within the electronic document, etc.

FIGS. 5-12 generally provide flowcharts illustrating various methods of generating security features in electronic documents utilizing the system 200 described in connection with FIG. 4.

Figure 5:
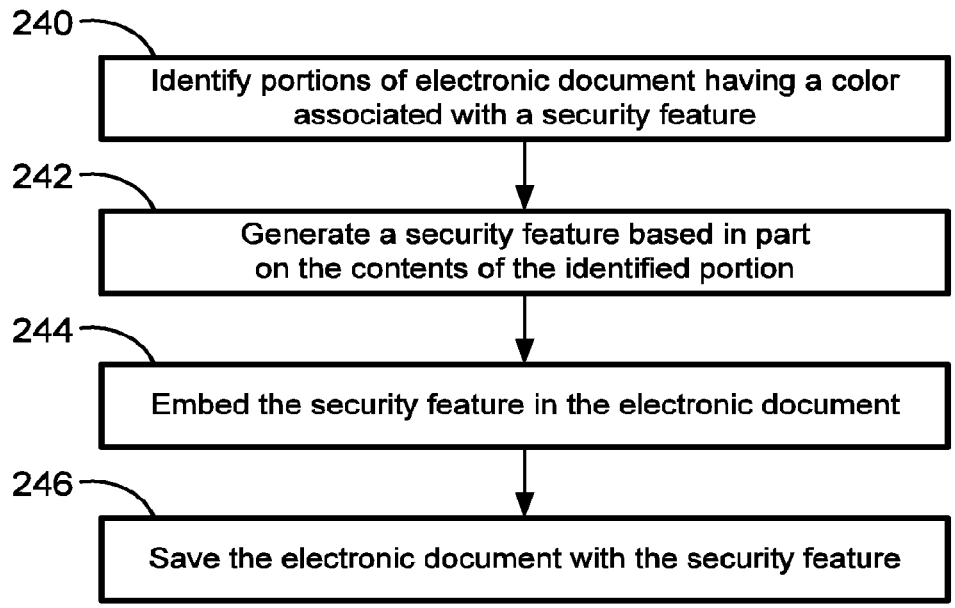
FIG. 5 is a flowchart illustrating an example process of embedding a digital security feature in a portion of an electronic document indicated to receive a digital security feature.

FIG. 5 is a flowchart illustrating an example process of embedding a digital security feature in an electronic document where portions of the electronic document to receive digital security features are indicated by font color. As described generally above, a particular font color (e.g., RGB value) can be associated with a digital security features such that the use of the particular color in the background or as text color of a particular string or paragraph is interpreted as a tagging mechanism to indicate the portion to be rendered in the particular color is a portion to receive an associated digital security feature. In some embodiments, particular font colors that correspond to particular digital security features can be stored in a lookup table in the hard drive storage 226. Some embodiments identify one or more portions of an electronic document as configured to be rendered in a color associated with a digital security feature (240). Digital security feature(s) can be generated which can be based in part on the contents of the identified portions of the electronic document (242). For example, where the security feature is an encryption technology, the contents of the identified portions can be encrypted according to the specified encryption level. The generated security feature(s) are embedded in the electronic document (244). In some embodiments, a digital security is embedded in an electronic document by appending a secured payload to the original version of the electronic document. In some embodiments, a digital security feature is embedded in an electronic document by creating a new electronic document, which can be, for example, a different file type than the original file type and which advantageously supports encrypted content, such as, for example, an XPS file can be generated when the original electronic file was a PDF file (or some other file type). In some embodiments, the newly generated file is one which supports allowing secured/encrypted content to be embedded therein. The new electronic document incorporating the digital security feature is saved where it can be retrievably accessed (e.g., in the hard drive storage 22 or the remote server 230) (246).

While the generated digital security feature(s) can be based in part on the contents of the identified portion, the present disclosure is not so limited: the generated digital security feature(s) can be generated based in part on the color associated with the security feature, on the location of the identified portion within the document, and/or on pre-programmed/predetermined aspects that are unrelated to the contents of the identified portion.

In embodiments where the electronic document is a markup language file, the font colors of text strings, highlighting, and/or background is indicated by tags, glyphs, etc. within the markup language. Identifying the portions of the electronic document having a particular color associated with a particular security feature (240) can be carried out by culling the font color, highlighting color, and/or background color indicators from the markup language and determining whether any of the color indicators correspond to a color associated with a security feature. The contents of the identified portion of the electronic document can also be extracted from the markup language file by determining the text string having the font color indicator or the contents of a region of the electronic document having the specified color as a background color. It is particularly noted that the use of font color to tag ("indicate") portions of an electronic document to receive digital security features can be indicated by the font color of a text string within the document or by color of a background color surrounding particular text. The use of the background color allows for designating blocks or regions of a document that can be generally defined by geometric boundaries (e.g., a square, rectangle, circle, etc.) rather than by boundaries of individual text strings. Contents of the block or region thus defined by the particular color are thus extracted from the markup language to receive further security processing. It is specifically noted that a block or region defined by background color can include multiple, distinct text strings in separate paragraphs and each can have distinct font sizes, font types, etc. In some embodiments, users generating electronic documents for use with the system 200 to generate digital security features can therefore choose from two different approaches in tagging contents of the electronic documents to receive digital security features: the font color of particular text strings within the document can be specified, and/or regions of the document can be specified in a block by setting a background color of the region.

Figure 6:
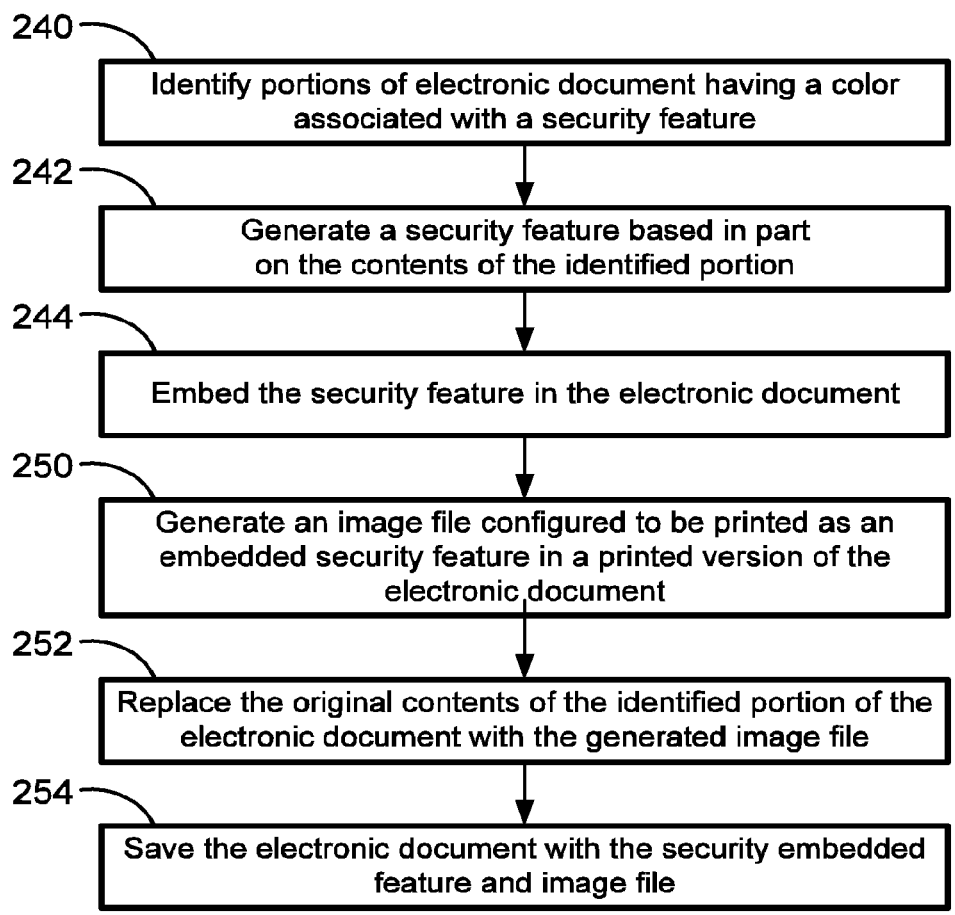
FIG. 6 is a flowchart illustrating an example process of embedding a digital security feature in an electronic document while incorporating printable security features in the electronic document to thereby secure a printed version of the electronic document.

FIG. 6 is a flowchart illustrating an example process of embedding a digital security feature in an electronic document while incorporating printable security features in the document to thereby secure a printed version of the electronic document. Similar to the discussion above, portions of an electronic document are identified as being configured to be rendered in a color associated with a security feature (240). A digital security feature is generated which can be based in part on the identified portions (242) and the digital security feature is embedded in the document (244). An image file is generated which is configured to be printed as an embedded security feature in a printed version of the electronic document (250). The image file can be a raster image, such as a raster image with a file type extension BMP, JPG, PNG, TIFF, etc. The generated image file can be similar to the image files discussed above in connection with FIGS. 1-3 and can be a reproduction altered image such that copies or optical scans of an original printed document including a printed version of the image file are altered with respect to the original printed version.

In some embodiments, the image file can include latent images formed from line screen patterns overlaid or situated adjacent to visually integrated settings. The original contents of the identified portions of the electronic document are replaced with the generated image file (252). By modifying the electronic document to include the image file in place of the original content, the electronic document becomes (if it was not already) a mixed raster content file, with some portions specified via a markup language using tags, glyphs, etc. to specify the text content, formatting, etc. of the electronic document and other portions specified by a raster file, which may itself be further subject to formatting (e.g., size, position, etc.) via tags, glyphs, etc. In some embodiments, the resulting modified mixed raster content electronic document advantageously prevents the original replaced content, which may be a text string, from being readily searchable by a conventional searching algorithm that searches for text strings within a document. In some embodiments, the raster image that takes the place of the original content is not readily interpreted by searching algorithms, although a printed version of the electronic document may still reveal the embedded information as a latent image with assistance of an appropriate viewing aid, for example. Additionally or alternatively, the generated image file can be encrypted and appended to the electronic document along with an encrypted version of the original content in a secure appendix accessible upon proper authentication. The modified electronic document with the digital security feature and the image file is saved to a location where it can be retrievably stored (254).

Figure 7:
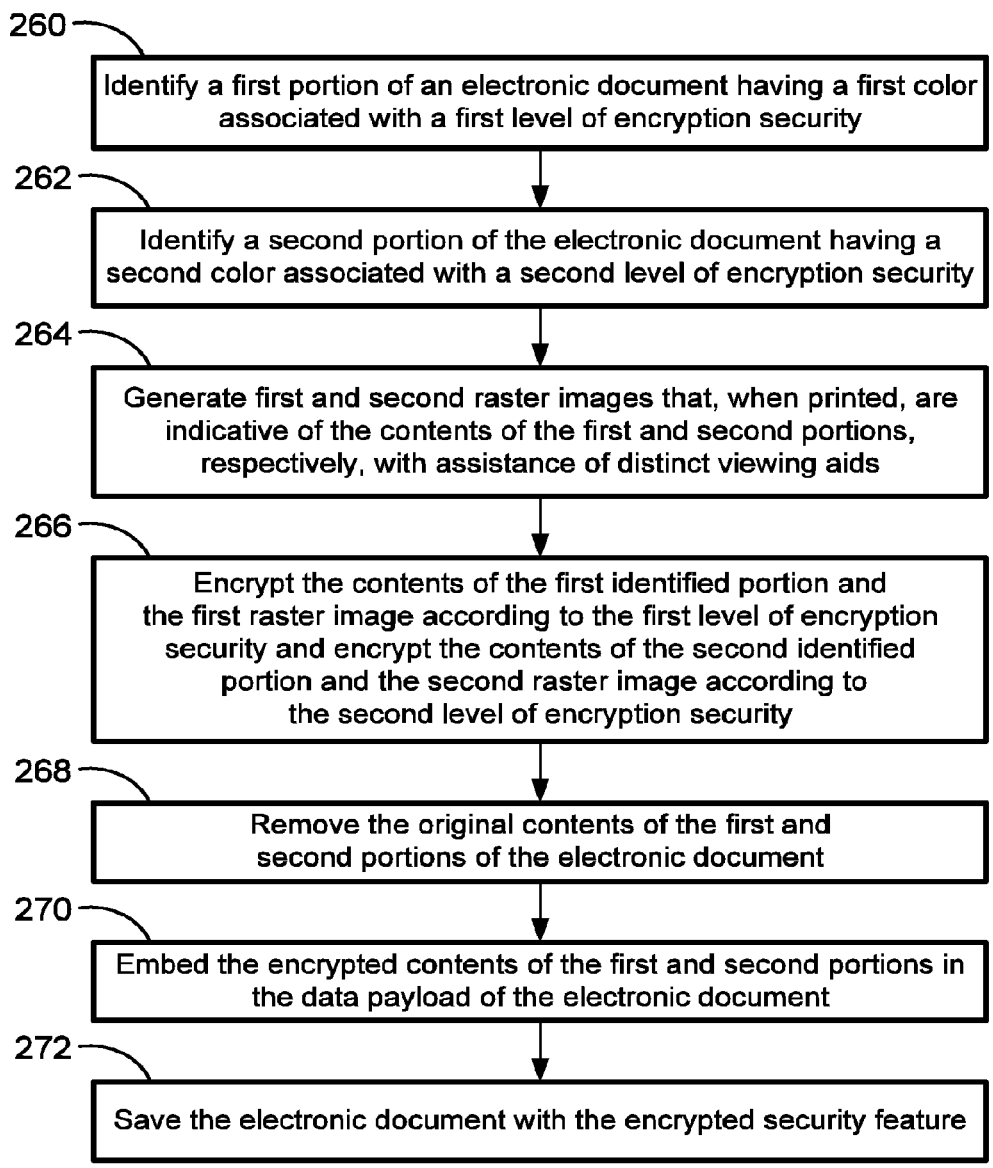
FIG. 7 is a flowchart illustrating an example process of embedding multiple levels of encryption security features in an electronic document.

FIG. 7 is a flowchart illustrating an example process of embedding multiple levels of encryption security features in an electronic document. A first portion of the electronic document having a first color associated with a first level of encryption security is identified (260). A second portion of the electronic document having a second color associated with a second level of encryption security is identified (262). Similar to the discussion above, the first and second portions can each include one or more text strings in the respective font colors and/or can include one or more regions ("blocks") of the electronic document specified by background color of the respective regions. Raster image files are generated based on the contents of the identified portions (264). In some embodiments, the identified first portion can include distinct segments and a raster image can be generated for each of the distinct segments that embeds information indicative of the content of the distinct segments. For example, the first portion can include both a sentence and a distinct word each rendered in the first color, but separated from one another by other text and content not designated for encryption. Accordingly, the image generation is carried out be generating a first raster image that includes an embedded latent image indicative of the content of the sentence and a second raster image that includes an embedded latent image indicative of the content of the distinct word. Similarly, raster image(s) are generated with embedded latent images indicative of the contents of the second portion (264).

The content of the first portion and the corresponding generated raster image(s) are encrypted according to the first level of encryption security (266). Similarly, the content of the second portion and the corresponding generated raster image(s) are encrypted according to the second level of encryption security (266). The original, unencrypted content of the first and second portions are removed from the electronic document (268). The encrypted contents of the first and second portions and their corresponding raster image(s) are then appended to the electronic document in a secure appendix thereof where access is limited to users providing appropriate authentication to decrypt and/or access the information (270). The encrypted contents of the first portion and the encrypted contents of the second portion are generally stored in separate encrypted data payloads, each requiring separate authenticating keys to decrypt and/or access the information. The electronic document is saved where it can be retrievably accessed (272).

Advantageously, in some embodiments, the first raster image(s) are generated with latent images formed from a line screen pattern having a first line frequency and the second raster image(s) are generated with latent images formed from a line screen pattern having a second line frequency. An original printed version of the electronic document with the identified contents replaced by the corresponding generated raster images thus allows two levels of viewing permission according to the line frequencies of the two latent images. A viewing aid configured to constructively interfere with the latent image at the first line frequency to thereby reveal the embedded content indicated by the latent image is useful to reveal the content of the first portion, but not the content of the second portion. Similarly, a viewing aid configured to constructively interfere with the latent image at the second line frequency to thereby reveal the embedded content indicated is useful to reveal the content of the second portion, but not the content of the first portion. Controlling the physical security of the viewing aids thus provides an additional measure of information security by selectively allowing the viewing aids to be retained only by those authorized to view the corresponding information.

Figure 8:
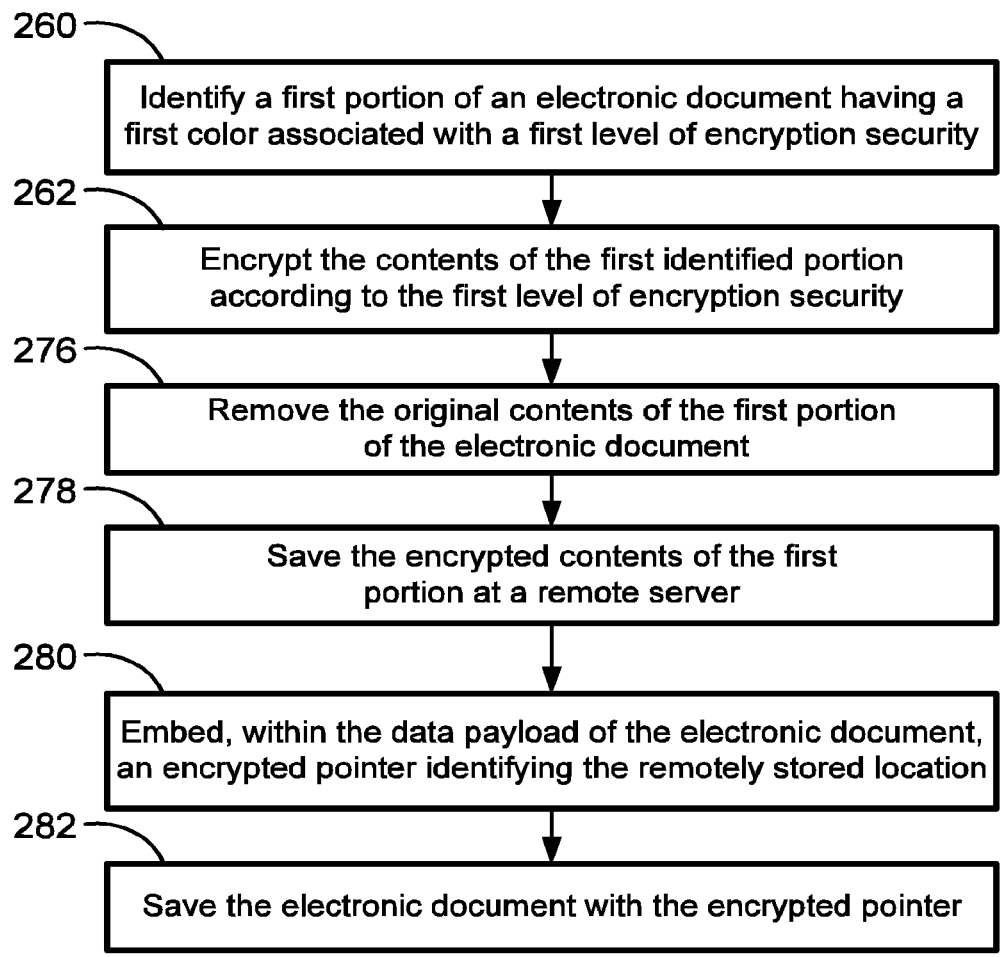
FIG. 8 is a flowchart illustrating an example process of encrypting data from an electronic document, removing the original data from the document, and storing the encrypted data separately from the electronic document.

FIG. 8 is a flowchart illustrating an example process of encrypting data from an electronic document and removing the encrypted data from the electronic document. A first portion of an electronic document configured to be rendered with a first color is identified (260). The contents of the first portion are encrypted according to a first level of encryption security (274). The original, unencrypted contents of the first identified portion are removed from the electronic document (276). The encrypted contents of the first portion are saved to a remote server location (e.g., the remote server 230 in the system 200) (278). A pointer or other indicator is embedded within the data payload of the electronic document which indicates the location of the remotely stored encrypted information (280). The electronic document having the encrypted pointer to identify the removed encrypted contents is then saved such that it can be retrievably accessed (282).

Appropriate headers and/or tags are added to the electronic document to convey that contents of the document have been removed and conveying the location of the removed contents. The pointer can optionally be encrypted as well such that a subsequent viewer of the electronic document is required to provide appropriate authentication to decrypt and/or access the pointer information indicating the location of the removed contents of the electronic document. A viewer of the electronic document can be required to download the encrypted contents from the remote server 230 in order to access the original content. Downloading the encrypted contents can optionally require further authentication to access the remote server 230 (even once its location is known from the optionally encrypted pointer appended to the electronic document). For example, where a viewer of the electronic document utilizes the system 200 for viewing, the user can receive a prompt via the display 212 of the user interface 210 requesting authentication information to decrypt a pointer indicating the location of removed contents of the electronic document. The user can provide the authentication information via the user input device(s) 214 and then the processing system 220 can communicate with the remote server 230 to retrieve the encrypted contents or to receive further instructions for authentication. The user can then provide, as necessary, additional information via the user input device(s) (which may also include one or more biometric identification systems) to authenticate and/or access the encrypted information stored at the remote server 230.

Figure 9A:
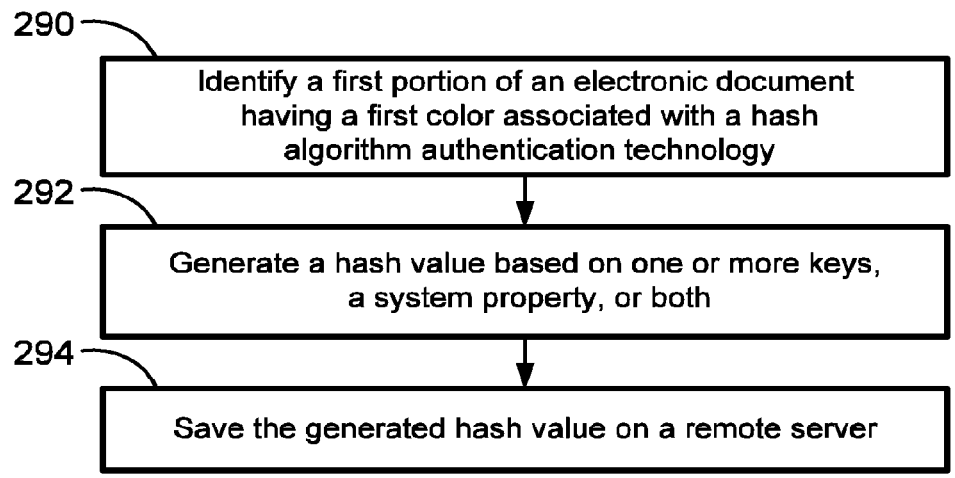
FIG. 9A is a flowchart illustrating an example process of digitally characterizing an electronic document by generating a hash value for the document.

FIG. 9A is a flowchart illustrating an example process of digitally characterizing an electronic document by generating a hash value for the electronic document. A first portion of a document having a first color associated with a hash algorithm authentication technology is identified (290). A hash value is generated to provide a digital signature substantially unique to the electronic document with keys based on one or more aspects of the electronic file and/or the system on which the document is generated and/or used (292). The generated hash value is saved on a remote server (e.g., the remote server 230) where it can be retrievably accessed (294). The generated hash value can additionally or alternatively be stored within the data payload of the electronic document. A secure payload can also be appended to the electronic document which is configured to recalculate a new hash value upon the electronic document being re-saved, copied, and/or edited. The secure payload can be configured to take further actions as discussed above depending on whether the editing, copying, and/or saving event was authorized according to authentication provided by a user.

Figure 9B:
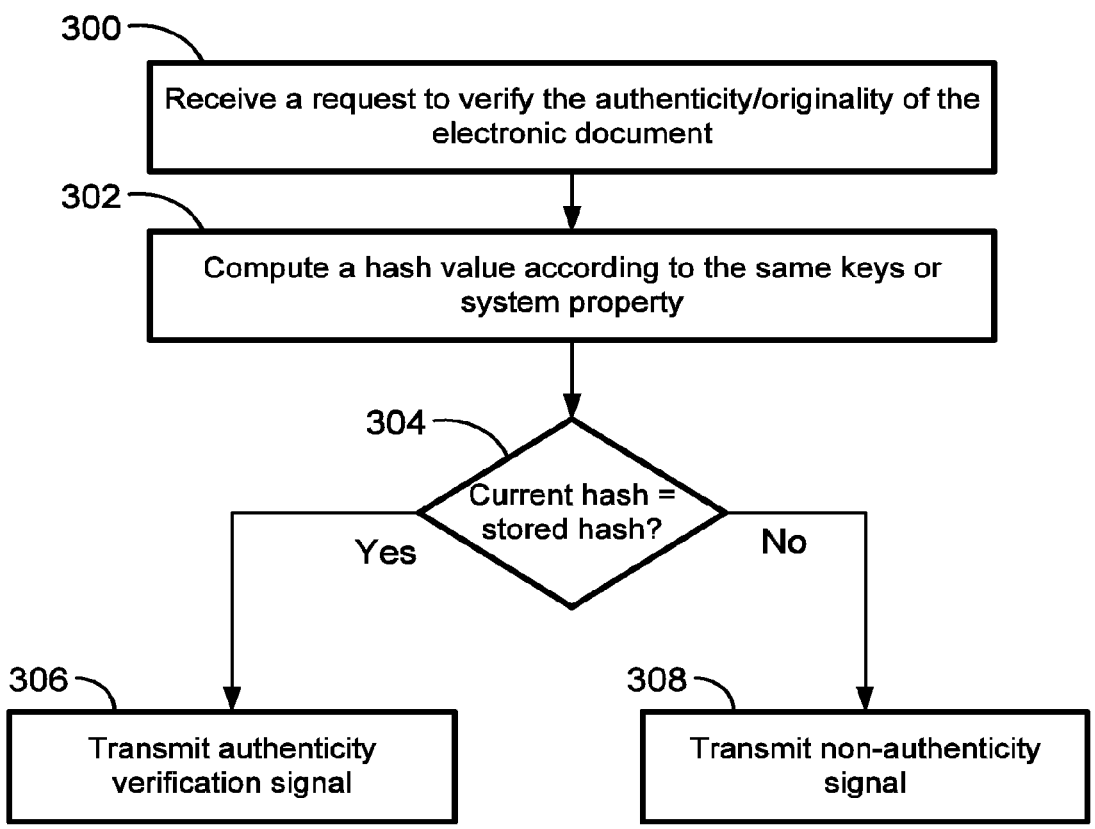
FIG. 9B is a flowchart illustrating an example process of authenticating an electronic document by verifying its hash value.

FIG. 9B is a flowchart illustrating an example process of authenticating an electronic document by verifying its hash value. With reference to the system 200 of the FIG. 4, the remote server 230 receives a request to verify the authenticity/originality of the electronic document (300). A hash value is computed according to the same keys or system property as was used to generate the original hash value (302). If the document has not been altered relative to original computation of the hash value, the new hash value and the original hash value will agree, thus providing an indication of authenticity. Any modification to the document, such as occurs when copying a document results in a new hash value that does not agree with the original. The new hash value is compared to the original hash value (304). If the two agree, a signal is generated by the remote server 230 to communicate to the processing system 220 that the document being viewed is an original, authentic electronic document (306). If the new hash value does not agree with the original, stored hash value, a signal is generated by the remote server 230 to communicate to the processing system 220 that the electronic document is not authentic (308).

Figure 10:
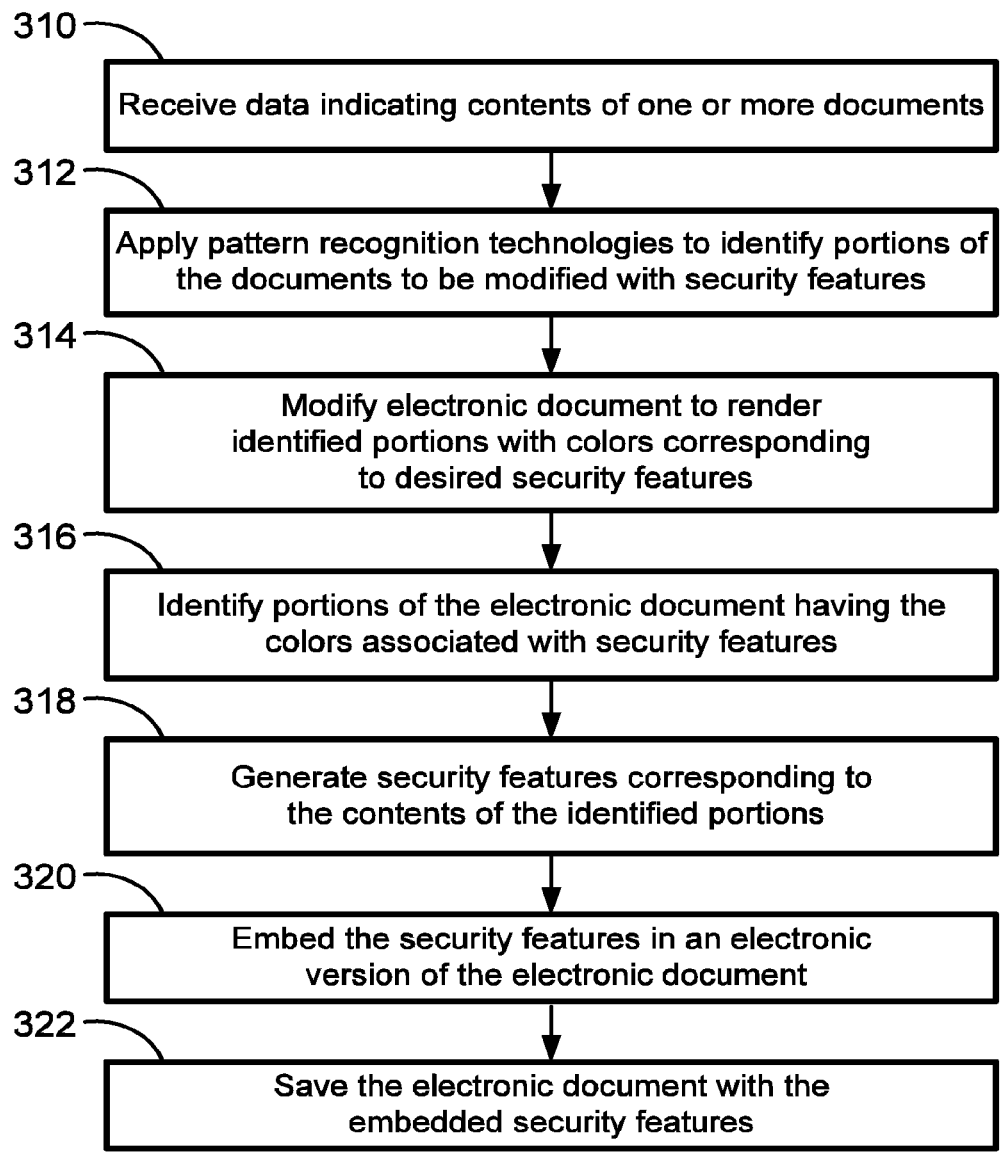
FIG. 10 is a flowchart illustrating an example process of applying a pattern recognition algorithm to tag desired regions of an electronic document to receive embedded digital security features.

FIG. 10 is a flowchart illustrating an example process of applying a pattern recognition algorithm to tag desired regions of an electronic document to receive embedded digital security features. Data indicating the contents of a document is received (310). In some embodiments, the received data can be in the form of a markup language specifying the text content, formatting, etc. of an electronic document. In some embodiments, the received data can be a mixed raster content file or a full raster content file such as a PDF file output from a scanner. For example, a scanner can be configured to scan one or more documents and output files indicative of the scanned document. The output files can be rendered as markup language files, to the extent that the scanner (and associated software and/or firmware) is able to reconstruct a markup language rendering of the document based on the scanned reproduction of the document. Regions that cannot be rendered in markup are retained in raster, thus resulting in a mixed raster content file.

The received data is then passed through a pattern recognition module to identify portions of the document to modified with security features (312). The pattern recognition module can incorporate a character recognition module (e.g., optical character recognition technology ("OCR") and the like) to reconstruct underlying data contents of a document from raster representations thereof. The pattern recognition module can identify, for example, all social security numbers by identifying character strings in the format 'XXX-XX-XXXX'. Similarly, pattern recognition can be applied to recognize phone numbers, addresses, medical prescriptions, patient data, names, ages, dates of birth, passwords, maiden names, answers to security questions, etc. Additionally or alternatively, the pattern recognition module can recognize pre-identified portions of a document. In some embodiments, a set of standard forms are optically scanned. For example, the forms may be laid out such that the bottom 2 inches of fillable space on each document is filled with secured content (e.g., a medical patient record that includes the patient's medical history near the bottom of the form). Accordingly, the pattern recognition module can be configured to recognize that the document is of the type having secured content in the bottom 2 inches, which can be indicated, for example, based on control numbers and/or barcode labels appearing on the document. Additionally or alternatively, a user input can indicate to the system 200 that the document being analyzed by the pattern recognition module is a particular type of predefined document that includes the secured content in the particular region. The pattern recognition module, while not separately illustrated in the system 200, can be implemented in the processing system 220 and/or the remote server 230, or can be implemented as a separate device optionally combined with an optical scanner.

The electronic document is modified based on the output of the pattern recognition module to incorporate colors associated with security features (314). For example, identified text strings are edited to be rendered with colors associated with desired security features and identified regions of the document are edited such that the background color of the document throughout the identified region is rendered with a color associated with desired security features. The modified document is then subjected to further processing to identify the portions of the electronic document having colors associated with security features (316). Appropriate security features are generated based on the identified colors and/or the contents of the identified portions of the electronic document (318). The digital security features are embedded in the electronic document (320). The electronic document, with the embedded security features, is saved where it can be retrievably accessed (322). In some embodiments, the first three blocks 310, 312, 314 illustrated in the flowchart of FIG. 10 can be considered an initial "wrapper" preceding the process illustrated by the flowchart of FIG. 5 to generate embedded digital security features in an electronic document specified by document text color and/or background color.

In some embodiments, the content of the electronic document is modified. Additionally or alternatively, the output of the pattern recognition module can be used directly to generate the security features in the electronic document without first modifying the document with appropriate colors (314) which are then identified (316). However, utilizing the color tagging scheme with the pattern recognition technology offers advantages by allowing the pattern recognition module to be used within the common color-tagging scheme described herein. Furthermore, the electronic document, once modified with appropriate colors to indicate security features, is adapted to be further edited and re-processed to add further security features within the system 200 without further recourse to the pattern recognition module to identify the regions for receiving the security features.

In some embodiments of the present disclosure, a stack of physical documents can be provided to a scanning system configured to scan the stack of documents, destroy the originals, and generate a secure electronic document and corresponding secure physical document incorporating embedded security features in each. For example, a stack of patient records can be provided which includes sensitive and/or private information on portions thereof. The stack of patient records can be scanned, passed through a pattern recognition module, and regions of the patent records can be rendered with colors to indicate ("tag") the presence of content to be secured with security features. The regions can be indicated by changing the color of identified text in the specified regions or by changing the background color of the entire region. A new physical document is created which incorporates hidden information fields, authentication fields, and/or barcode fields similar in some respects to those described in connection with FIGS. 3A and 3B. The original physical document is then destroyed. In addition, an electronic version of the original document is created which includes secure payloads having encrypted information and/or hash values stored therein to provide secure storage of selected, color-identified information in the document and/or to provide an indication of whether the electronic document is an authorized version.

Figure 11:
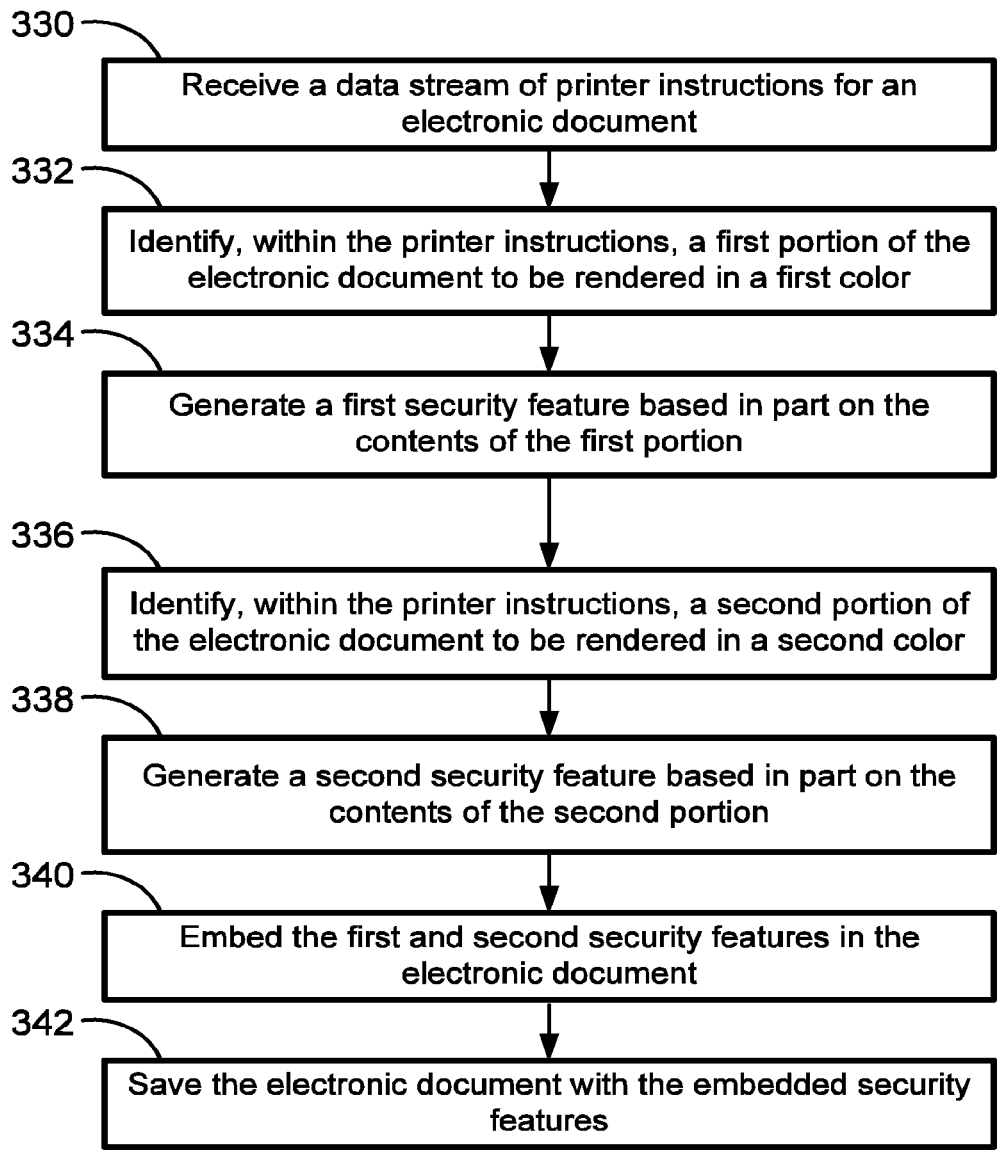
FIG. 11 is a flowchart illustrating an example process of embedding multiple security features in an electronic document based on multiple colors in the document.

FIG. 11 is a flowchart illustrating an example process of embedding multiple security features in an electronic document based on multiple colors in the document. The process illustrated by FIG. 11 is suited for implementing the system 200 as a print driver such that a secure electronic document can be generated from a generic software program adapted to provide printing functionality and which allows font colors to be selected. In some embodiments, the print driver described herein can be implemented on the processing system 220 and/or the remote server 230 of the system 200. A stream of data including printing instructions is received (330). The printing instructions can be formatted in a page description language such as a printer command language (e.g., PCL 5, PCL 6) or can be in an XML page specification (XPS) printer command language, etc. It is noted that many Microsoft Office Suite products provide printing instructions as XPS formatted data streams. Generally, the printing instructions are formatted as a markup language and include tags, glyphs, etc. to specify the formatting of particular content within the document. The print driver identifies, within the printing instructions, a first portion of the electronic document to be rendered with a first color associated with a first security feature (332). The print driver generates a first digital security feature based in part on the contents of the first portion (334). The print driver identifies, within the printing instructions, a second portion of the electronic document to be rendered with a second color (336). The print driver generates a second digital security feature based in part on the contents of the second portion (338). The generation of the first and second digital security features (334, 338) can also be carried out independent of the contents of the first and second portions, and can be carried out based in part on the colors associated with the security features, on user inputs, on the location(s) within the electronic document at which the portion(s) are situated, and/or other aspects unrelated to the contents of the identified portions. The first and second digital security features are embedded in the electronic document (340). The electronic document including the embedded security features is then saved where it can be retrievably accessed (342).

Figure 12:
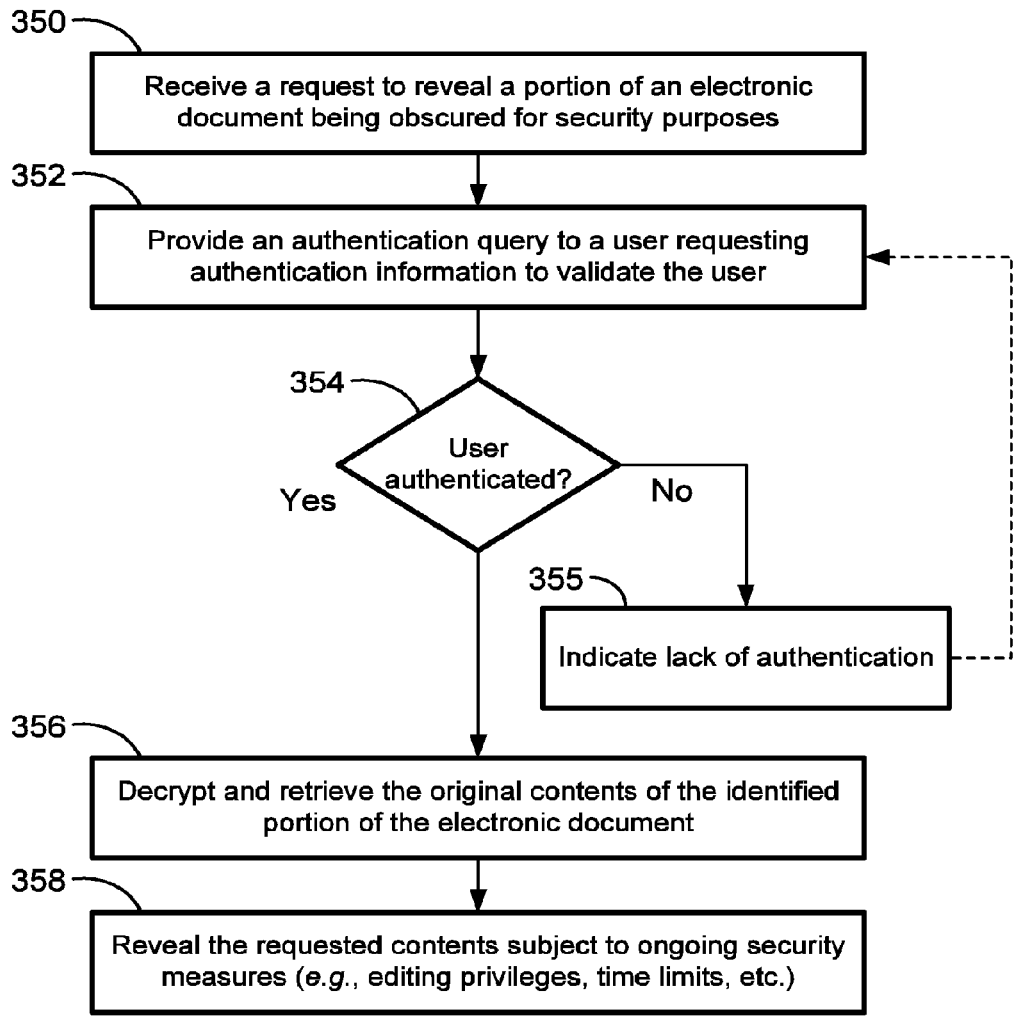
FIG. 12 is a flowchart illustrating an example process of accessing encrypted contents of an electronic document.

FIG. 12 is a flowchart illustrating an example process of retrieving encrypted contents of an electronic document. For example, with reference to FIG. 4, an electronic document having embedded security features can be configured such that viewing the electronic document on the display 212 of the user interface 210 obscures portions of the document subjected to security features. Such an embodiment advantageously allows for a secured electronic document to be viewed without revealing the contents of the protected portions of the electronic document. The protected portions can be obscured on the screen by rendering the protected portions as, for example, solid blocks of uniform color or as outlined blocks including messages indicating that the contents have been redacted for security, etc. A user viewing such a protected document on the display 212 is thereby protected from a passerby inadvertently viewing the secured contents of the document. A request is received to reveal a portion of the electronic document that is obscured for security purposes (350). The request can be initiated, for example, in response to a user input and/or upon opening a secured electronic document. An authentication query is provided to the user via the user interface 210 to invite the user to provide authentication information (352). The user then inputs authentication information which can include an authentication certificate, password, biometric identifier, etc., or a combination of these. The processing system 220 and/or remote server 230 then determines whether the user is authorized to access the requested content (354). If the user is authenticated, the requested information is decrypted (356) and revealed in a readable format via the display 212 (358). If the user is not authenticated, an indication of lack of authentication is provided (355) (e.g., via the display 212) and the user is optionally again invited to provide appropriate authentication information (352). While the contents of the requested portion of the document is revealed (358), the portions of the document can optionally be revealed subject to additional security measures which operate to, for example, limit the length of time the requested information is displayed without renewing authentication, limit the ability to edit the requested information subject to additional authentication, etc.

FIGS. 13-15 generally illustrate example screen shots of an electronic document as it appears on a display together with various functionally described modules to gradually modify the contents and/or format of the electronic document. In the example described below provided to further clarify aspects of the disclosure, the electronic document is a Health Care Application which includes patient-specific information, some portions of which is relatively more private than other portions. For example, as will be described below a name and phone number are considered relatively non-private and such information can be made available to a wide range of people in a health care setting without necessitating security features. For example, schedulers may use the contact information when scheduling appointments for the patient. On the other hand, details of current medications taken by the patent and the patent's social security number may be subjected to heightened security features, which need not be the same as one another. While the example screen shots are taken from an example of a health care application form, the example is intended to illustrate the functions of the disclosure with respect to generic electronic documents receiving color-tag specified digital and/or printed security features. Similar to the discussion of flowcharts in FIGS. 5-12, appropriate references are included below to aspects of the system 200 shown in FIG. 4.

Figure 13A:
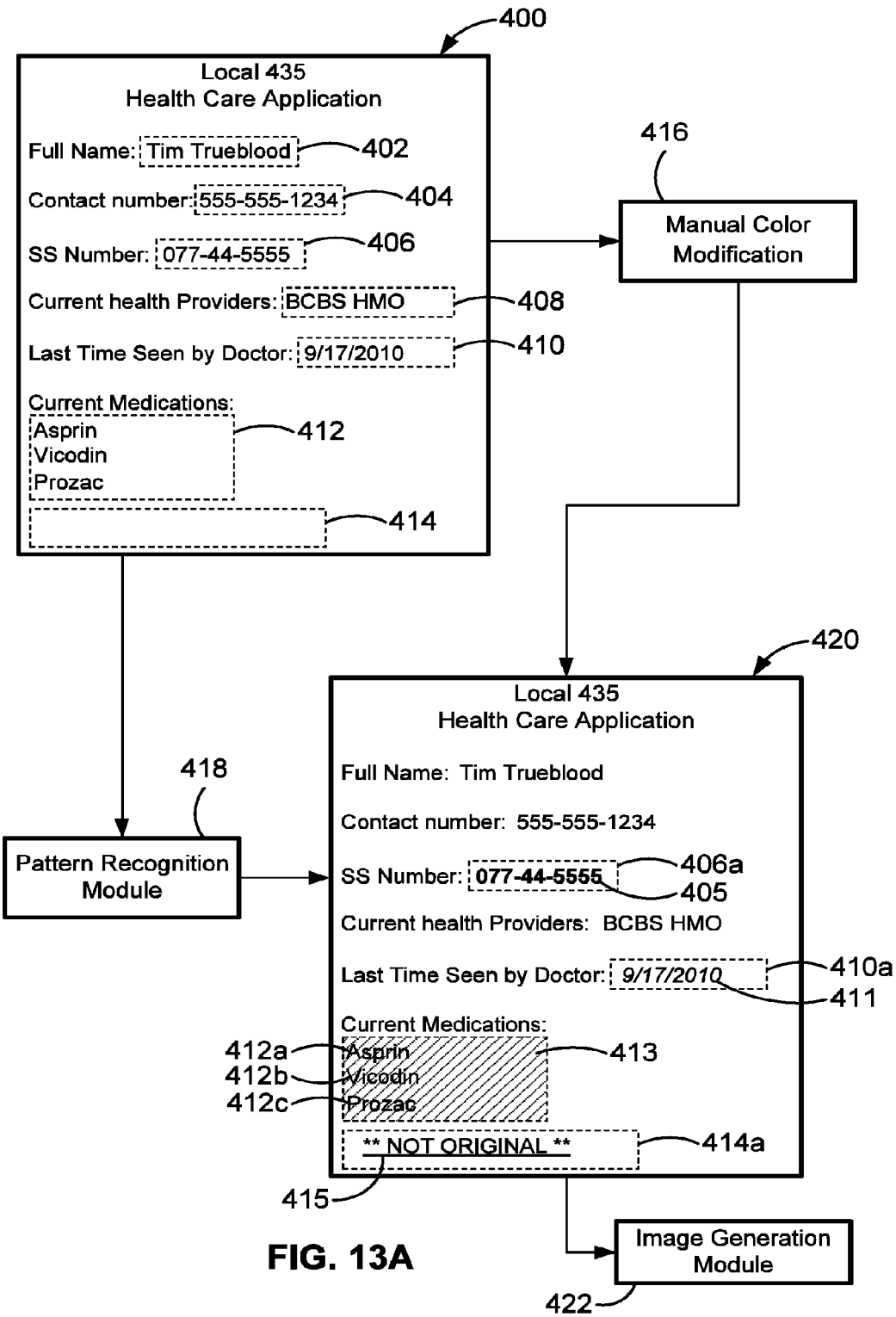
FIGS. 13A and 13B illustrate screen shots of an example of a health care form as it is rendered on the display screen within a word processing system operating according to machine readable instructions on the processing system.
Figure 13B:
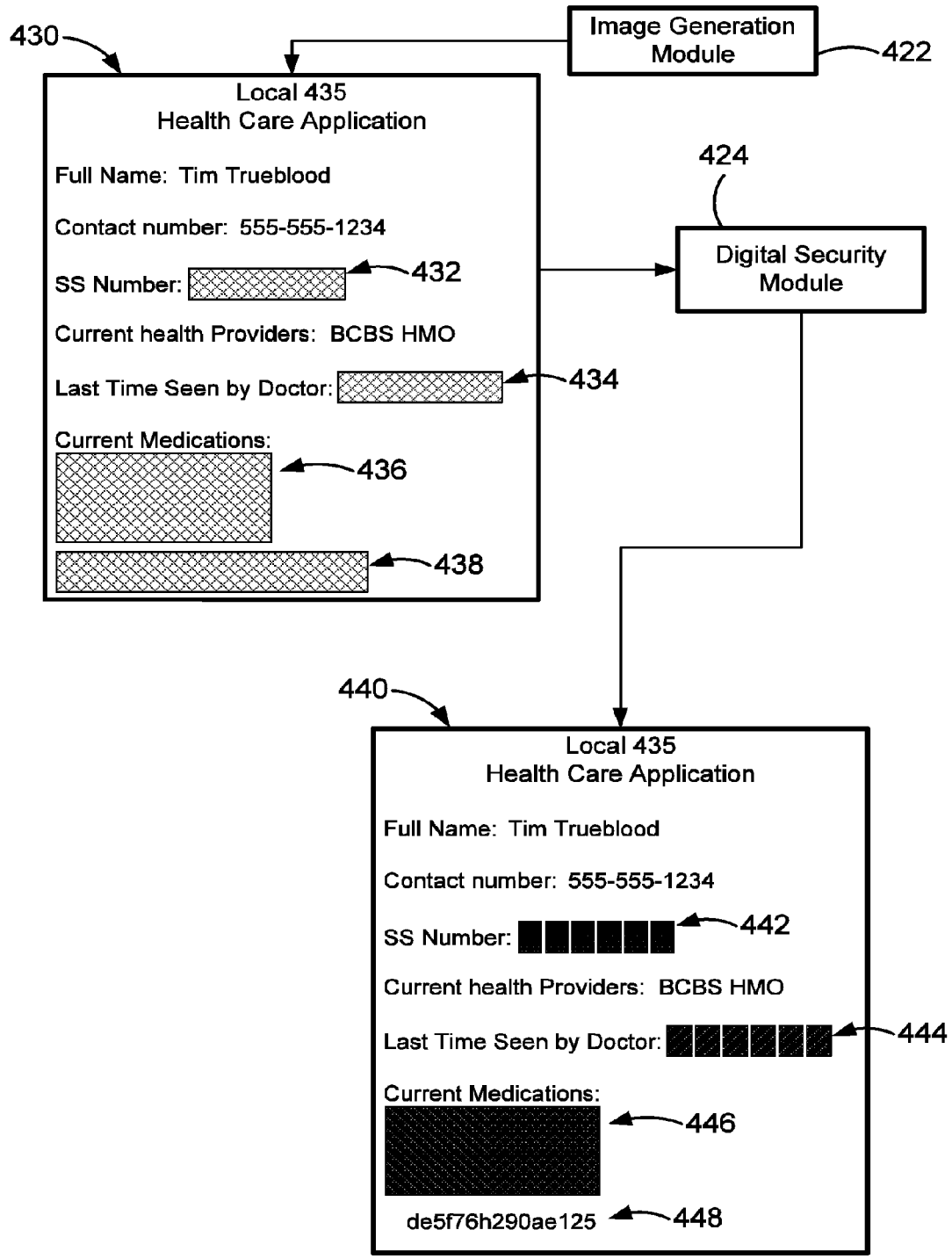

FIGS. 13A and 13B illustrate screen shots of an example of a health care form 400 as it is rendered on the display screen 212 within a word processing system or other document viewing/manipulation software operating according to machine readable instructions on the processing system 220. The health care form 400 lists information indicative of a health care patient's contact information and medical history.

The health care form 400 includes a name field 402, a phone number field 404, a social security number field 406, a health provider field 408, a last seen date field 410, and a current medications region 412. Also included is an original verification field 414. The name field 402 includes a text string indicating the patient's name: "Tim Trueblood." The phone number field 404 includes a text string indicating the patient's phone number: "555-555-1234." The social security number field 406 includes a text string indicating the patent's social security number: "077-44-5555." The health provider field 408 includes a text string indicating the patient's current health care provider: "BCMS HMO." The last seen date filed 410 includes a text string indicating the last date the patient was seen for a health care appointment: "9/17/2010." The current medications region 412 includes one or more text strings indicating the medications being taken by the patient: "Asprin, Vicodin, Prozac." The original verification field 414 is vacant of text strings in the health care form 400.

The health care form 400 can be edited to modify and/or add color tags associated with security features by either modifying content in the health care form to change the colors of the content or by adding additional content to the health care form with particular colors associated with security features. As shown in FIG. 13A, the editing can be accomplished by either manually editing the document as indicated by the block 416 or by applying a pattern recognition module 418 to automatically recognize portions of the document and edit the contents of those portions to be rendered in colors associated with security features. Some functions of the pattern recognition module 418 have been described above in connection with FIG. 10. In the block 416, a user can manually select or highlight particular text strings via the user input(s) 214 to edit the particular text strings to be rendered with appropriate colors, which are shown in the color-tagged screen shot 420 of the edited electronic document.

In the example illustrated by the color-tagged screen shot 420, the colored social security number field 406a is rendered with a first security color (e.g., green: RGB=1, 200, 112); the colored last date seen field 410a is rendered with a second security color (e.g., magenta: RGB=180, 20, 180); the colored current medications region 413 is also rendered with the second security color; and the colored original verification field 414a is edited to include verification text 415: " NOT ORIGINAL " rendered in a third security color (e.g., cyan: RGB=1, 190, 160). For the purposes of this disclosure, the drawings are rendered in black and white, and therefore color tagging is not readily apparent. Accordingly, in order to distinguish the first, second, and third security colors: text rendered in the first security color is indicated by bold text, text rendered in the second security color is indicated by italicized text, and text rendered in the third security color is indicated by underlined text. The text content of the colored social security number field 406a includes a text string 405, which is not edited, relative to the contents of the original social security number field 404, but the color of the text string 405 is edited to be in the first security color (bold text for the purposes of this disclosure). Similarly, the text string 411 in the colored last date seen field 410a retains the same text content, but is rendered in the second security color (italicized text for the purposes of this disclosure). On the other hand, the current medications region 413 retains the three text strings "Asprin" 412a, "Vicodin" 412b, and "Prozac" 412c, but the background color of the colored current medications region 413 is edited to be rendered in the second security color (indicated by a patterned block for purposes of this disclosure).

Three different security features are specified on the color-tagged health care form 420. In the example system, each security feature is associated with both a digital security feature, for an electronic version of the secured document, and a printed security feature to be embedded in a printed version of the secured document. The first security color is associated with a first level of encryption security and a printed hidden content field with a first line screen frequency latent image. The second security color is associated with a second level of encryption security and a printed hidden content field with a second line screen frequency latent image. The contents indicated by the first security color and the contents indicated by the second security color can be provided to users with two different authentication levels. The third security color is associated with a digital hash algorithm authorization feature and an authentication field having a latent image revealed in a reproduction of the printed document. The color tags can thus be associated with multiple access levels of encrypted digital or obscured printed information. The color tags can also be associated with multiple forms of digital and corresponding printed security features.

Referring to FIG. 13B, while described above in the context of a screen shot, it is understood that the above described color modifications are reflected by editing tags, glyphs, etc. in a markup language file that specifies the contents, formatting, etc. of the electronic version of the health care form 420. The electronic file with color-tags is then passed to an image generation module 422 to generate additional security features to be embedded within the electronic document. The image generation module 422 can be employed to generate reproduction altered raster images to be printed on an original printed version of the electronic document. In some embodiments, the image generation module can be considered the printed security generation module because the raster images generated by the image generation module 422 are configured to be embedded as security features in printed versions of the document 420.

The image generation module 422 detects the colored fonts and regions and applies appropriate security technology by converting the secured text or region to a raster image (e.g., BMP, TIF, PNG, etc.). The image generation module 422 retains the original information content as either document "payload" in the electronic document or by storing the secured information in an external file or database (e.g., the remote server 230 of the system 200) for use in the encryption/decryption process, such as, for example, as described in connection with FIG. 8.

The image generation module 422 outputs four raster images corresponding to each of the color tagged portions of the colored health care form 420. The four raster images are illustrated in the embedded image screen shot 430. In some embodiments, the SSN hidden content image 432 is an image which includes a latent image indicative of the patient's social security number. In some embodiments, the latent image within the SSN hidden content image 432 is formed from a line screen pattern having a first line frequency. The latent image within the SSN hidden content image 432 is overlaid with a visually integrated setting including a pattern of lines, line elements, dots, irregularly shaped elements, etc. to mask the presence of the latent image and make the latent image imperceptible to the unaided eye. When printed, the SSN hidden content image 432 reveals the latent image indicating the patient's social security number with assistance of a viewing aid appropriately matched to the first line frequency. Similarly, the hidden content images 434, 436 include latent images indicating the date of last doctor's visit (in the image 434) and the patient's current medications (in the image 436). The latent images embedded within the hidden content images 434, 436 are formed from line screen pattern with a second line frequency. Advantageously, the first line frequency and the second line frequency are chosen to be sufficiently different that a viewing aid for one is not helpful to reveal the contents of the other. For example, the first line frequency can be 60 lines per inch while the second line frequency can be 77 lines per inch. The hidden content images 432, 434, 436 are thus similar in some respects to the hidden content field 130 discussed above in connection with FIGS. 3A and 3B.

Each of the hidden content images 432, 434, 436 are situated at the locations of the respective fields which content they include as embedded latent images, i.e., at the locations of the social security number field 406, the health care provider field 410, and the current medications region 412. Additionally, an authentication image 438 is generated and situated at the location of the original verification field 414. The authentication image 438 is a raster image that includes a latent image formed from a line screen pattern that indicates the color-tagged text string 415. While the latent image is not readily discernible in an original printed version of the authentication image 438, the latent image becomes discernible in a reproduction or facsimile of the original printed version. The authentication image 438 is thus similar to the authentication field 110 discussed above in connection with FIGS. 3A and 3B.

The electronic document displayed as the image screen shot 430 is then processed in a digital security module 424 to encrypt the original contents of the color-tagged fields/regions 404a, 410a, 413, and the hidden content images associated with each field 432, 434, 436. Additionally, the digital security module 424 generates a hash value 448 to provide a digital signature indicating the authenticity of the electronic document. The digital security module 424 adds additional digital security to the electronic document by encrypting both the raster security image (432, 434, 436) and the original text of the color-tagged fields. The digital security module 424 can use multiple levels of encryption (e.g., the first/green color indicated security level and the second/magenta color indicated security level). The digital security module 424 can store encrypted information as either a payload of the electronic document or by storing the encrypted information in an external file or database (e.g., the remote server 230) for recovery/decryption during the viewing process.

A screen shot 440 of the document having digital security features applied shows each of the encrypted fields as blacked-out redacted regions 442, 444, 446, respectively. The contents of the redacted regions 442, 444, 446 (and their respective security images) cannot be revealed without authenticating a user and decrypting the encrypted contents. The hash value 448 is shown as a hexadecimal number, but can generally take any value specified by the hash algorithm employed to uniquely characterize the electronic document such that subsequent unauthorized copies can be identified.

As described herein in connection with FIGS. 13A and 13B, stages of the above described methods for dynamically generating embedded security features in a document are described as being implemented by functionally described modules (e.g., the pattern recognition module 418, the image generation module 422, the digital security module 424, etc.). The modules described herein can be computing systems having hardware, software, and/or firmware components to perform the functions described. Any of the various modules described above can be combined with one another in the processing system 220 or can be separated in one or more processing systems associated with, and communicatively coupled with, the processing system 220 in the system 200.

Figure 14A:
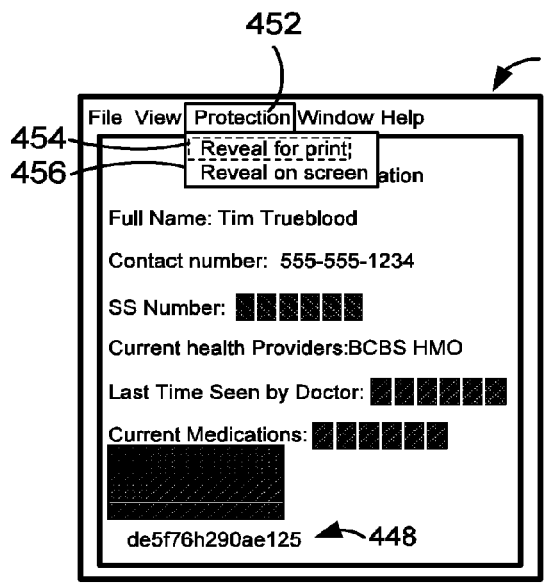
FIGS. 14A through 14C illustrate screen shots of the electronic document being revealed for printing, and an image of the printed document.
Figure 14B:
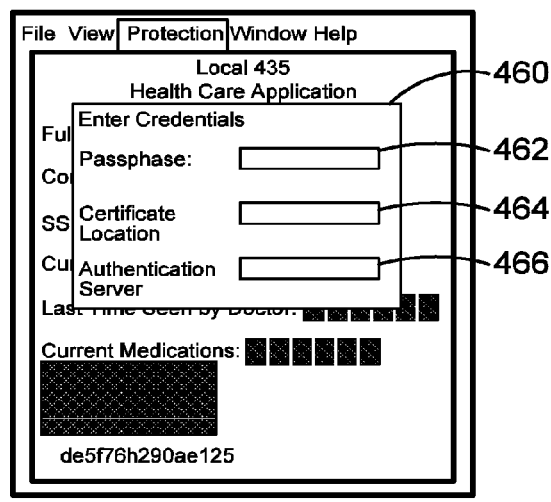
Figure 14C:
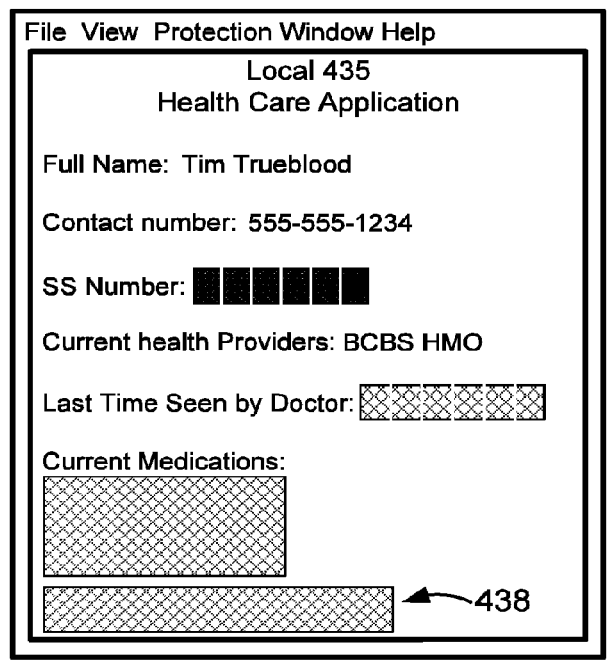

FIGS. 14A through 14C illustrate screen shots of an electronic document being revealed for printing, and an image of the printed document. FIG. 14A is a screen shot of the electronic document displayed via the display 212 of the system 200. The electronic document is being viewed within a viewing program for viewing electronic documents with security features. The viewing program includes a navigation menu 450 having one or more selectable fields for a user to make selections to operate the viewing program. As shown in FIG. 14A, the Protection submenu 452, which is identified by the heading: "Protection," is selected. The options under the Protection submenu 452 are "Reveal for print" 454 and "Reveal on screen" 456. In the example shown in FIG. 14A, the reveal for print 454 option is selected. FIG. 14B is a screen shot showing a portion of an authentication procedure to authenticate a user before revealing contents of the secured electronic document for printing. As shown in FIG. 14B, a pop-up authentication window 460 appears which requests user inputs in order to authenticate the user. The authentication window 460 includes input fields 462, 464, 466. The user input information into the input fields 462, 464, 466 via the user input device(s) 214 to specify a particular passphrase (462), digital certificate (464), which may be specified by a file location on the hard drive storage 226, and an authentication server (466). FIG. 14C is a screen shot of the partially revealed electronic document which is ready to be printed. Because the reveal for print option 454 was selected, the revealed contents of the secured fields are rendered as the raster images 434, 436 that are configured to be embedded as security features in a printed document. The social security field remained redacted, which can be due to, for example, the user not having an appropriate authentication level necessary to view the social security field, which was encrypted according to a distinct level of encryption security (e.g., first/green color security level). Additionally, the hash value 448 is replaced with the authentication image 438.

Figure 15A:
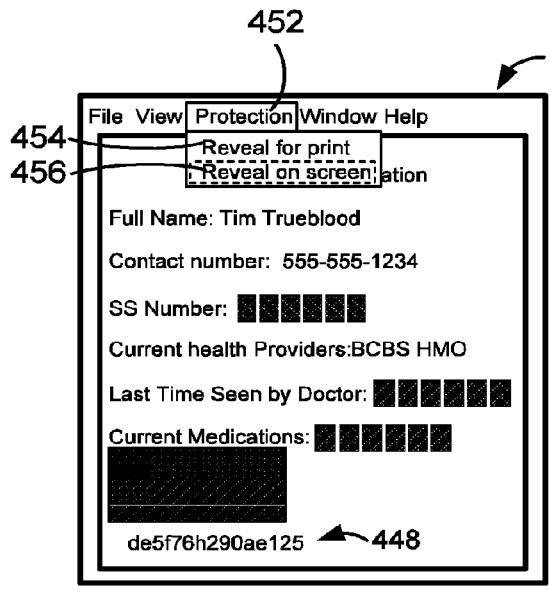
FIGS. 15A through 15C illustrate screen shots of the electronic document being revealed on a display screen.
Figure 15B:
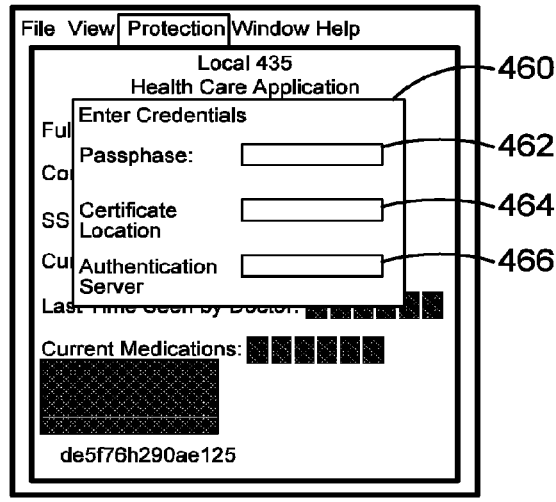
Figure 15C:
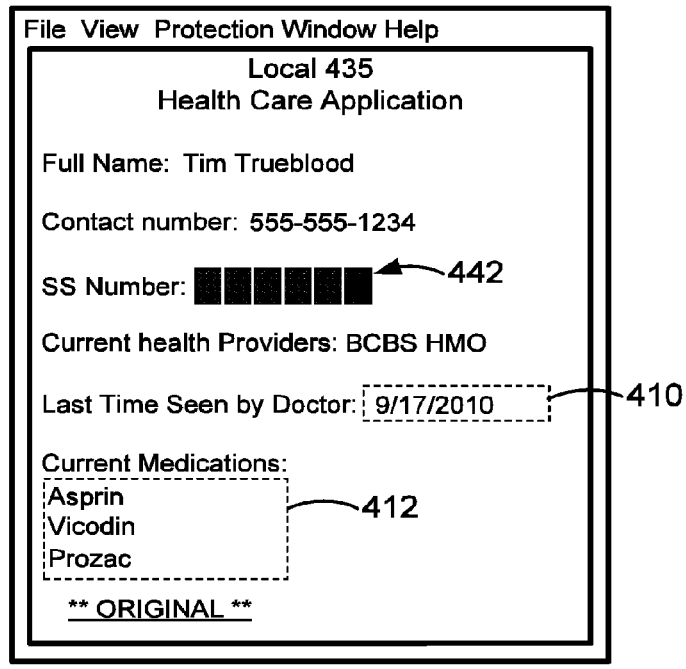

FIGS. 15A through 15C illustrate screen shots of the electronic document being revealed on a display screen. FIG. 15A is similar to FIG. 14A except that the reveal on screen option 456 is selected. In FIG. 15B, the authentication window 460 is displayed again and the user is prompted for additional inputs to complete the fields 462, 464, 466. FIG. 15C is a screen shot of the display 212 displaying the electronic document after the user has provided the requested authentication information. The screen shot in FIG. 15C displays the original content in the last date seen field 410 and the current medication region 412. Because the authentication level was insufficient to allow viewing the contents of the social security field 406, the social security field remains obscured with the redacted region 442. However, the redacted regions 444, 446 shown in FIG. 15A are replaced with the original contents of those fields, i.e., the text strings "9/17/2010" and "Aspirin, Vicodin, Prozac." Some embodiments of the present disclosure accordingly allow for reversible digital redaction of particular specified contents of an electronic document.

In some embodiments, an additional option can be included in the Protection submenu 452 titled "Open for editing" in which case the revealed document is revealed with color-tags in place indicating particular security features to apply to the colored portions of the document. Opening a secured electronic document for editing can optionally require a further level of authentication.

Some embodiments of the present disclosure further provide a system and method for generating a digital version and physical version of a document with embedded security features in each. In some embodiments, data within a digitally stored document is tagged for application of an embedded security feature based on location within the document, text font, text color, or some other tagging mechanism. The document can be secured both digitally and in hard copy by processing the document through a filter that embeds security features based on the tagging mechanism. In some embodiments, the filter is implemented as a printer driver to allow a user to create a secured document by printing their document to the selected print driver. In some embodiments, generating a secured document via a printer driver advantageously allows the secured documents to be generated from an arbitrary document generation program or independent of the document generation program used to initially generate the document.

The security features can include, for example, obscuring portions of the document to only allow viewing with particular keys, which can be implemented as a lens, filter, or transmitted image. A digital or electronic version of the document can be created which digitally secures corresponding digital information utilizing, for example AES encryption technologies and matching keys to selectively allow access to the encrypted information. The encrypted information can be included in the digital version of the document as both textual information and as an encrypted raster image suitable for inclusion in a corresponding printed version of the document. In some embodiments, the digital version of the document can be configured to electronically display the regions of the document tagged for protection as an electronic version of the raster image or as some other obscuring block. In some embodiments, users providing sufficient authenticating information are able to view the contents obscured via the obscuring block with assistance of a viewer made available upon providing authenticating information, such as a key to decrypt the encrypted information. The viewer can be, for example, a mouse-controlled viewer that can be activated, deactivated, and/or repositioned via a user-controlled device.

The security features can additionally or alternatively include, for example, embedding authenticating information in the document such that copies of the original appear in an altered state relative to the original. A digital version of the document can include a hash value associated with an authorized version of the digital document, such that subsequently created versions of the digital document can be identified as unauthorized copies when their associated hash values do not match the original. The system advantageously allows for embedded security features to be generated on printed documents created via consumer level printing technologies. Aspects of the present disclosure advantageously allow for embedded information to be rendered as a raster graphics image that is dynamically generated to embed information that dynamically retrieved. The dynamic generation of the raster image can also be optimized according to particular printing technologies employed.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A system comprising:
   a communication interface; and
   computing system configured to:
   receive data, via the communication interface, indicative of: (i) a security feature to be embedded in a document, and (ii) an indication of a printer system;
   determine one or more image generation settings associated with the printer system indicated by the received data;
   generate a digital image having content at least partially specified by the received data, the generated digital image having a foreground and a background, at least one of which includes a line screen pattern, wherein the foreground and the background of the digital image are configured such that a scanned reproduction of an original printed version of the digital image is reproduced in an altered form relative to the original printed version, and wherein the digital image is generated in accordance with the determine one or more image generation settings; and
   send, via the communication interface, an indication of the generated digital image.

2. The system of claim 1, wherein the foreground of the digital image comprises a latent image that is embedded within a visually integrated setting of the document.

3. The system of claim 1, wherein the received data includes information specifying characters or symbols portrayed via a line screen pattern included in the foreground of the generated digital image.

4. The system of claim 1, wherein the computing system determining the one or more image generation settings comprises: (i) referring to a database and determining whether the indicated printer system us associated with one or more image generation settings predetermined to provide desirable printing performance using the indicated printer system; and (ii) if the indicated printer system is determined to be associated with one or more image generation settings, determining to use the one or more image generation settings associated with the identified printer system according to the database, or rather if the indicated printer system is determined to not be associated with one or more image generation settings, determining to use one or more default image generation settings.

5. The system of claim 1, wherein the one or more image generation settings comprise at least one of line frequency, line orientation, or print density.

6. The system of claim 1, wherein the generated digital image includes a latent image embedded within a visually integrated setting of the document, the latent image comprising a line screen pattern.

7. The system of claim 6, wherein the original printed version of the latent image is distinguishable from the visually integrated setting with a visual aid having a characteristic line frequency corresponding to the line frequency of the line screen pattern of the latent image, and wherein the latent image is configured to be reproduced in an altered form so that the latent image is not similarly distinguishable from the visually integrated setting with the same visual aid.

8. The system of claim 1, wherein the computing system is further configured to generate and send an indication of a given digital image dynamically responsive to receiving data corresponding to the given digital image.

9. The system of claim 1, wherein the computing system is further configured to:
   identify a portion of an electronic version of the document configured to be rendered in a color associated with a particular security feature;
   generate the particular security feature based in part on data associated with the identified portion;
   embed the generated security feature in the electronic version of the document; and
   save the electronic version of the document including the embedded security feature.

10. A method comprising:
- receiving data, via a communication interface, indicative of: (i) a security feature to be embedded in a document, and (ii) an indication of a printer system;
- determining one or more image generation settings associated with the printer system indicated by the received data;
- generating a digital image having content at least partially specified by the received data, the generated digital image having a foreground and a background, at least one of which includes a line screen pattern, wherein the foreground and the background of the digital image are configured such that a scanned reproduction of an original printed version of the digital image is reproduced in an altered form relative to the original printed version, and wherein the digital image is generated in accordance with the determine one or more image generation settings; and
- sending, via the communication interface, an indication of the generated digital image.

* * * * *